(12) United States Patent
Kohno et al.

(10) Patent No.: US 12,535,353 B2
(45) Date of Patent: Jan. 27, 2026

(54) POSITION EVALUATION APPARATUS, POSITION EVALUATION METHOD, AND NON-TRANSITORY COMPUTER READABLE MEDIUM

(71) Applicant: NEC Corporation, Tokyo (JP)

(72) Inventors: Wataru Kohno, Tokyo (JP); Tomoyuki Hino, Tokyo (JP); Sakiko Mishima, Tokyo (JP); Takashi Matsushita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 434 days.

(21) Appl. No.: 18/206,469

(22) Filed: Jun. 6, 2023

(65) Prior Publication Data

US 2024/0102851 A1 Mar. 28, 2024

(30) Foreign Application Priority Data

Sep. 16, 2022 (JP) .................................. 2022-148417

(51) Int. Cl.
*G01H 9/00* (2006.01)
(52) U.S. Cl.
CPC .................................. *G01H 9/004* (2013.01)
(58) Field of Classification Search
CPC ...................................................... G01H 9/004
See application file for complete search history.

(56) References Cited

U.S. PATENT DOCUMENTS

2020/0319017 A1* 10/2020 Tian ........................ G02B 6/483
2021/0172729 A1* 6/2021 Huang ..................... G01L 1/242

FOREIGN PATENT DOCUMENTS

WO 2020/044648 A1 3/2020

* cited by examiner

*Primary Examiner* — Seung C Sohn
(74) *Attorney, Agent, or Firm* — Sughrue Mion, PLLC

(57) ABSTRACT

An apparatus includes memory and processor configured to: input, from a sensor, a signal indicating a characteristic vibration occurring at each position of an optical fiber, and estimate, based on the input signal, an aerial section in which the optical fiber being aerially laid over a pole is present; calculate, based on the input signal, sensing data indicating a vibration characteristic of each position of the optical fiber being present in the aerial section, and calculate a difference degree of the sensing data between two neighboring points of the optical fiber; and temporally integrate the difference degree, calculate a time average of the difference degree, estimate, based on a time average value of the difference degree, a position of the pole and a position of an extra length section of the optical fiber, and output an estimation result of positions of the pole and the extra length section.

21 Claims, 39 Drawing Sheets

| AERIAL or NON-AERIAL | REPRESENTATIVE LAYING CONDITION/ENVIRONMENT | TENSION TO OPTICAL FIBER | REPRESENTATIVE ACQUISITION SIGNAL |
|---|---|---|---|
| NON-AERIAL | INSTALLMENT IN UNDERGROUND CONDUIT | SMALL (BACKGROUND SIGNAL IS ALSO SMALL) | VIBRATION OF GROUND SURFACE (ABRUPT) |
| AERIAL | SUSPENSION ON UTILITY POLE OR STEEL TOWER | LARGE (BACKGROUND SIGNAL IS ALSO LARGE) | SWING BY WIND (STEADY) |

POSITION EVALUATION APPARATUS, POSITION EVALUATION METHOD, AND NON-TRANSITORY COMPUTER READABLE MEDIUM

INCORPORATION BY REFERENCE

This application is based upon and claims the benefit of priority from Japanese patent application No. 2022-148417, filed on Sep. 16, 2022, the disclosure of which is incorporated herein in its entirety by reference.

TECHNICAL FIELD

The present disclosure relates to a position evaluation apparatus, a position evaluation method, and a non-transitory computer readable medium.

BACKGROUND ART

By a technology called optical fiber sensing, it is possible to detect vibration/sound occurring in an arbitrary section on an optical fiber. Specifically, in the optical fiber sensing, an optical fiber sensor inputs coherent pulse light to an optical fiber, and receives backscattering light of the pulse light from the optical fiber. At this time, the optical fiber sensor detects a phase difference of backscattering light occurring at two points on the optical fiber, thereby detecting vibration/sound applied to the optical fiber in a phase difference evaluation section (gauge length section) that is a section between the two points. This type of optical fiber sensor is implemented by a phase-sensitive optical time domain reflectometer (phase-sensitive OTDR) or a distributed acoustic sensor (DAS). Hereinafter, descriptions are given on the assumption that the optical fiber sensor is the DAS.

Incidentally, there is a case where an existing optical fiber cable for communication including an existing optical fiber is laid at a part remote from the ground surface. Examples of such an optical fiber cable for communication include an optical fiber cable that is aerially laid over poles such as utility poles or steel towers.

FIG. 1 illustrates a configuration example of a sensing system using an existing optical fiber that is aerially laid over one-dimensionally arranged poles.

In the sensing system illustrated in FIG. 1, an existing optical fiber is suspended over poles 1 to 3, which are utility poles or steel towers. In addition, a DAS is connected to one end of the optical fiber.

The DAS can detect an environment of the vicinity of the optical fiber, based on vibration information indicative of vibration applied to the optical fiber. Examples of the environment of the vicinity of the optical fiber include the presence/absence of a wind, rain, lightning, or the like striking on the optical fiber.

Thus, the DAS can specify the position where the above-described environment occurs, by measuring position information of a vibration point.

However, the position information of the vibration point, which can be measured by the DAS, is the "length of the optical fiber from the DAS to the vibration point" (hereinafter, defined as "DAS coordinate"). For example, the DAS can measure a vibration point that is a location of occurrence of vibration on the DAS coordinate, based on a time difference between a time instant at which pulse light is input and a time instant at which the backscattering light of the pulse light is received.

In the example of FIG. 1, an extra length section of the optical fiber is included in the pole 2. Thus, in a case where vibration occurs at a position that is farther from the pole 2, as viewed from the DAS, the location of vibration occurrence on a pole-direction distance from the DAS (hereinafter, defined as "real-world coordinate") does not agree with the location of vibration occurrence on the DAS coordinate.

Thus, when constructing a sensing system using an optical fiber that is aerially laid over poles, it is necessary to exactly know the following information as the DAS coordinate.

Position of each pole on the DAS coordinate, and
Extra length section on the DAS coordinate.

As an example of a method for making a real-world coordinate agree with the DAS coordinate, there is a method in which an event is caused to occur at a position whose real-world coordinate is already known, and the position on the real-world coordinate is made to correspond to the location of vibration occurrence, which is measured by the DAS in regard to vibration occurring due to the event.

For example, it is conceivable that hammering is performed on a position of a specific pole whose real-world coordinate is already known, and the position of hammering on the real-world coordinate is made to correspond to the location of vibration occurrence which is measured by the DAS in regard to the vibration occurring due to the hammering.

However, the method of hammering the position of the pole has the following problems.

Since an examination is conducted for each of poles, a large number of steps are required.

If vibration is caused on a pole, since the vibration propagates to optical fibers that are aerially laid on both sides of the pole, the section that vibrates instantaneously spreads.

This method is not applicable to a pole (for example, a large pole such as a steel tower) that is difficult to artificially vibrate.

Thus, recently, there is proposed a method of knowing a position on the DAS coordinate of a pole on which an optical fiber is suspended, by a method other than the method of hammering a position of a pole.

For example, International Patent Publication No. WO 2020/044648 discloses a technology in which a section, where the strength of vibration detected by optical fiber sensing is a threshold or more, is determined to be a section in which a characteristic pattern of a utility pole occurs, and a point in the section, where a vibration of a maximum strength occurs, is estimated to be the position of the utility pole.

As described above, in the technology described in International Patent Publication No. WO2020/044648, attention is paid to the threshold of the strength of vibration (i.e., the magnitude of vibration), and the point where the vibration of the maximum strength occurs is estimated to be the position of the utility pole. Thus, in the technology described in International Patent Publication No. WO2020/044648, a point other than the point where the vibration of the maximum strength occurs cannot be estimated to be the position of the utility pole.

Therefore, it is considered that there is room for improvement of the estimation accuracy of the position of a pole on which an optical fiber is suspended.

SUMMARY

In consideration of the above problems, an example object of the present disclosure is to provide a position evaluation apparatus, a position evaluation method, and a non-transitory computer readable medium, which can improve the estimation accuracy of the position of a pole on which an optical fiber is suspended.

In a first example aspect, a position evaluation apparatus includes:
- at least one memory configured to store an instruction group; and
- at least one processor configured to, by executing the instruction group:
  - input, from a sensor, a signal indicating a characteristic vibration occurring at each position of an optical fiber, and estimate, based on the input signal, an aerial section in which the optical fiber being aerially laid over a pole is present;
  - calculate, based on the input signal, sensing data indicating a vibration characteristic of each position of the optical fiber that is present in the aerial section, and calculate a difference degree of the sensing data between two neighboring points of the optical fiber; and
  - temporally integrate the difference degree, calculate a time average of the difference degree, estimate, based on a time average value of the difference degree, a position of the pole and a position of an extra length section of the optical fiber, and output an estimation result of positions of the pole and the extra length section.

In a second example aspect, a position evaluation method being executed by a position evaluation apparatus, the method including:
- an aerial section evaluation step of inputting, from a sensor, a signal indicating a characteristic vibration occurring at each position of an optical fiber, and estimating, based on the input signal, an aerial section in which the optical fiber being aerially laid over a pole is present;
- a difference degree calculation step of calculating, based on the input signal, sensing data indicating a vibration characteristic of each position of the optical fiber being present in the aerial section, and calculating a difference degree of the sensing data between two neighboring points of the optical fiber; and
- a position estimation step of temporally integrating the difference degree, calculating a time average of the difference degree, estimating, based on a time average value of the difference degree, a position of the pole and a position of an extra length section of the optical fiber, and outputting an estimation result of positions of the pole and the extra length section.

In a third example aspect, a non-transitory computer readable medium stores a program that causes a computer to execute:
- an aerial section evaluation procedure of inputting, from a sensor, a signal indicating a characteristic vibration occurring at each position of an optical fiber, and estimating, based on the input signal, an aerial section in which the optical fiber being aerially laid over a pole is present;
- a difference degree calculation procedure of calculating, based on the input signal, sensing data indicating a vibration characteristic of each position of the optical fiber being present in the aerial section, and calculating a difference degree of the sensing data between two neighboring points of the optical fiber; and
- a position estimation procedure of temporally integrating the difference degree, calculating a time average of the difference degree, estimating, based on a time average value of the difference degree, a position of the pole and a position of an extra length section of the optical fiber, and outputting an estimation result of positions of the pole and the extra length section.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 3 is a diagram illustrating an example of a laying environment of an optical fiber;

EXAMPLE EMBODIMENT

Figure 1:
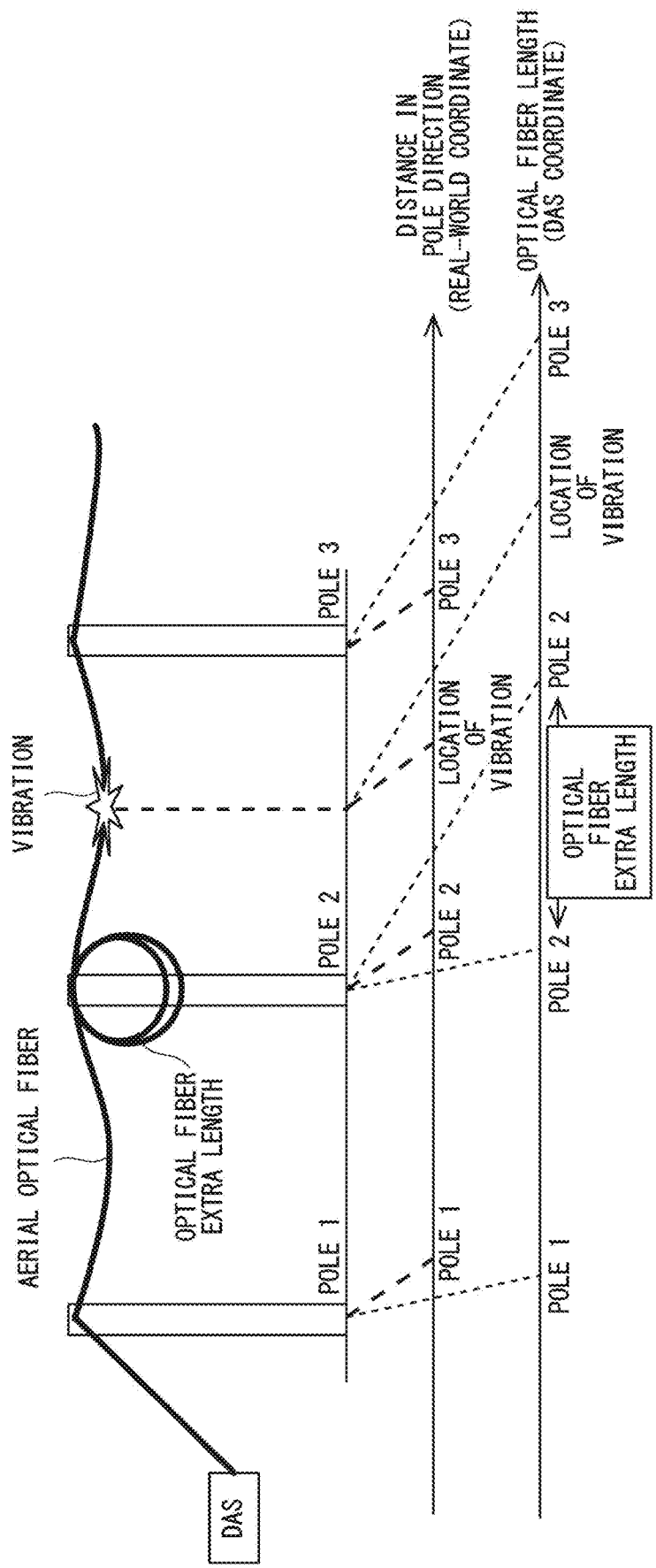
FIG. 1 is a diagram illustrating a configuration example of a sensing system using an existing optical fiber that is aerially laid over one-dimensionally arranged poles.

Hereinafter, example embodiments of the present disclosure are described with reference to the accompanying drawings. For the clarification of description, in the description below and the drawing, omissions and simplifications are made as appropriate. In addition, in each of the drawings described below, the same reference signs are given to the same elements, and overlapping descriptions are omitted unless otherwise necessary. Besides, concrete numerical values or the like described below are merely examples for easier understanding of the present disclosure, and the numerical values or the like are not limited to them.

Before describing example embodiments of the present disclosure, presupposed matters of each example embodiment are described.

Figure 2:
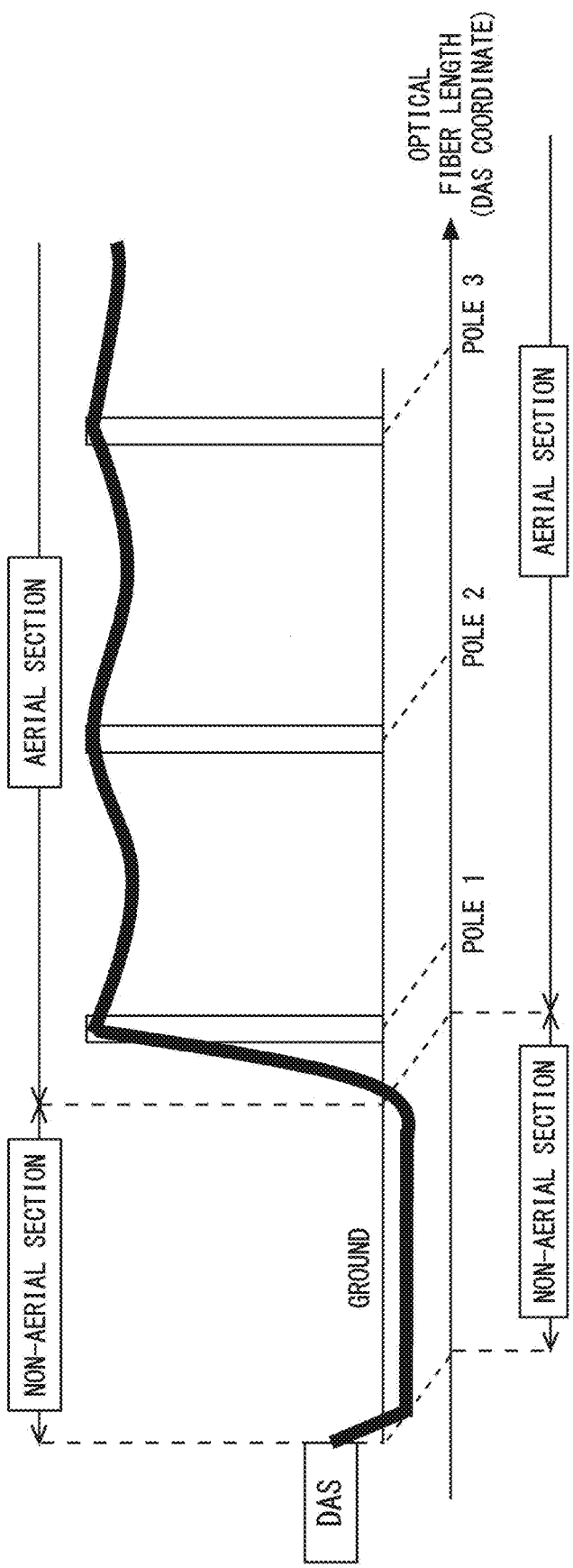
FIG. 2 is a diagram illustrating an example of a laying environment of an optical fiber.

To begin with, referring to FIG. 2 and FIG. 3, the environment of laying of an optical fiber is described.

As illustrated in FIG. 2 and FIG. 3, the laying environment of an optical fiber is generally classified into an aerial section in which an optical fiber that is aerially laid over poles is present, and a non-aerial section that is a section other than the aerial section.

In the non-aerial section, typically, the optical fiber is laid in an underground conduit. In addition, in the non-aerial section, the tensile force to the optical fiber is small, and thus the background signal is small. Besides, in the non-aerial section, the DAS, typically, detects the vibration of the ground surface that occurs abruptly.

On the other hand, in the aerial section, typically, the optical fiber is suspended over poles such as utility poles or steel towers. In addition, in the aerial section, the tensile force to the optical fiber is large, and thus the background signal is large. Besides, in the aerial section, the DAS, typically, detects the swinging due to the wind that steadily occurs.

In this manner, in the DAS, depending on whether the optical fiber is laid in the aerial section or in the non-aerial section, the quality of a signal obtained from the optical fiber greatly differs.

In each of the example embodiments of the present disclosure, as will be described later, in order to estimate the position of a pole, use is made of the similarity of steady background signals in one span (distance between poles) of the optical fiber that is aerially laid over poles. Thus, when estimating the position of a pole, it is necessary to limit an analysis target section to the aerial section.

Figure 4:
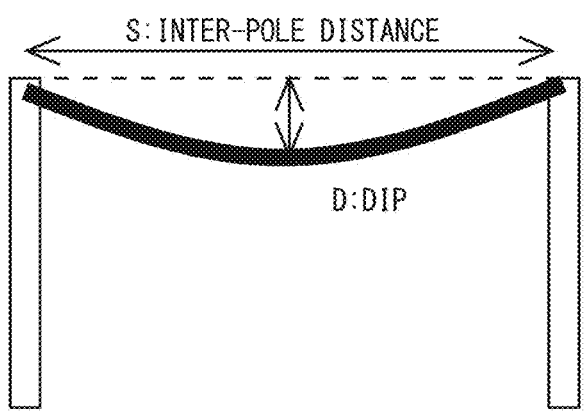
FIG. 4 is a diagram illustrating an example of a dip of an optical fiber in an aerial section.

Next, referring to FIG. 4, a dip of an optical fiber in the aerial section is described.

As illustrated in FIG. 4, it is assumed that an inter-pole distance is S, and a dip is D. As is known, if it is assumed that the height of the optical fiber aerially laid over the poles is identical, a length L of the optical fiber in the aerial section can be expressed as the length of a catenary curve, as indicated below.

$$L \approx S + \frac{8D^2}{3S}$$

In other words, the length L of the optical fiber can be calculated by performing, in regard to the inter-pole distance S, length correction by using $$\frac{8D^2}{3S}.$$

For example, if S=250 m and D=6 m, the value of length correction is 0.38 m. In other words, the value of length correction is about 0.15%, relative to S, and becomes a minimum value, compared to S.

Thus, as a 0th order approximation, a relation, the inter-pole distance≈the length of the optical fiber in one span, is established with a relatively high accuracy.

Thus, when estimating the position of the pole, if the analysis target section can be limited to the aerial section, it is considered that the estimation accuracy of the position of the pole is naturally improved.

Taking the above into account, in each of example embodiments of the present disclosure to be described below, an aerial section, in which an optical fiber aerially laid over poles is present, is estimated, and, by limiting an analysis target section to the aerial section, the position of the pole on which the optical fiber is suspended is estimated.

Hereinafter, each of the example embodiments of the present disclosure is described in detail.

First Example Embodiment

Figure 5:
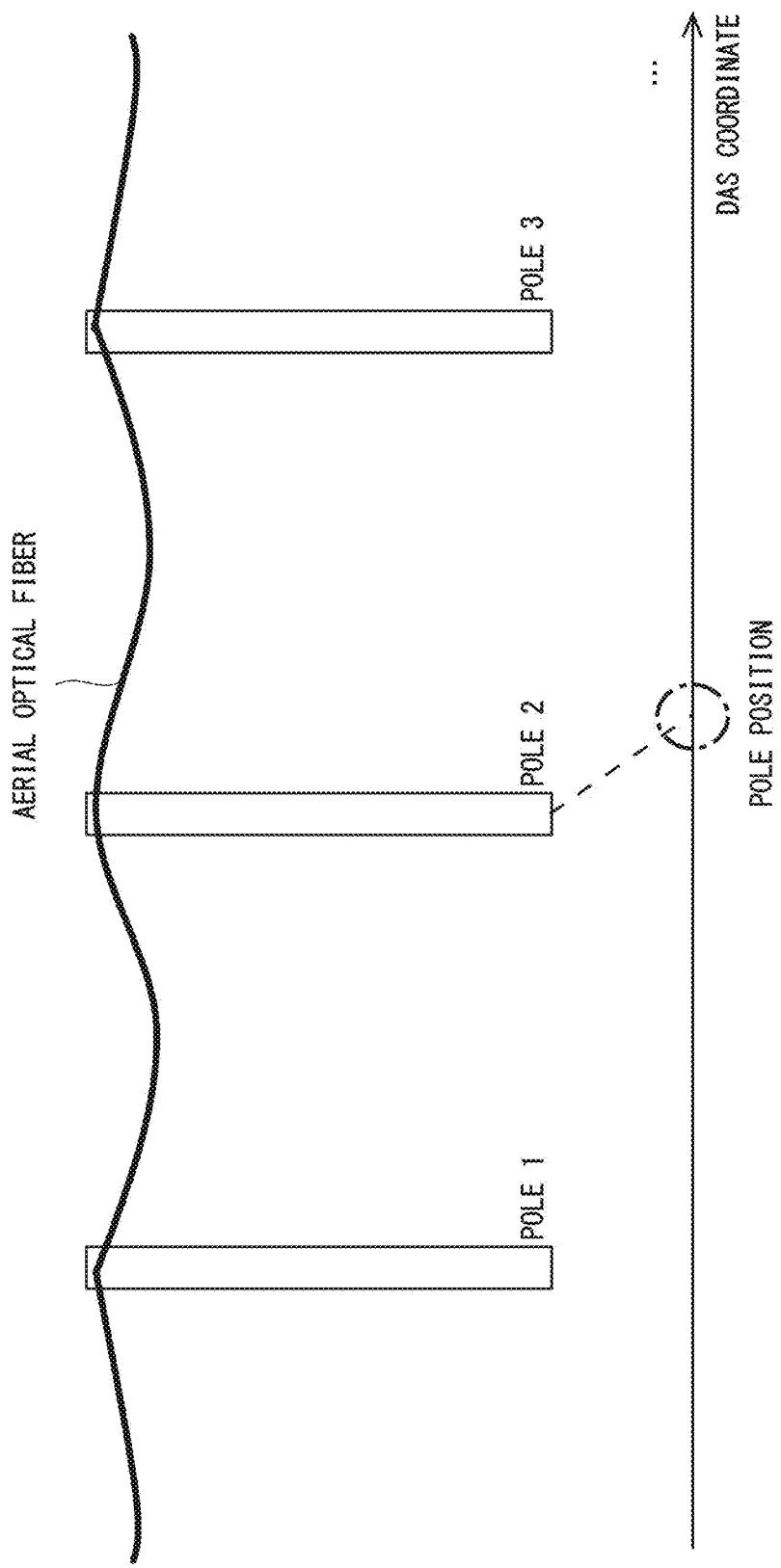
FIG. 5 is a diagram illustrating an applied example of a position evaluation apparatus according to a first example embodiment.

As illustrated in FIG. 5, in a first example embodiment, the position of a pole is estimated and output as a DAS coordinate value. The DAS coordinate is defined once again, i.e., the DAS coordinate is the length of the optical fiber measured by the DAS with reference to a certain point.

Figure 6:
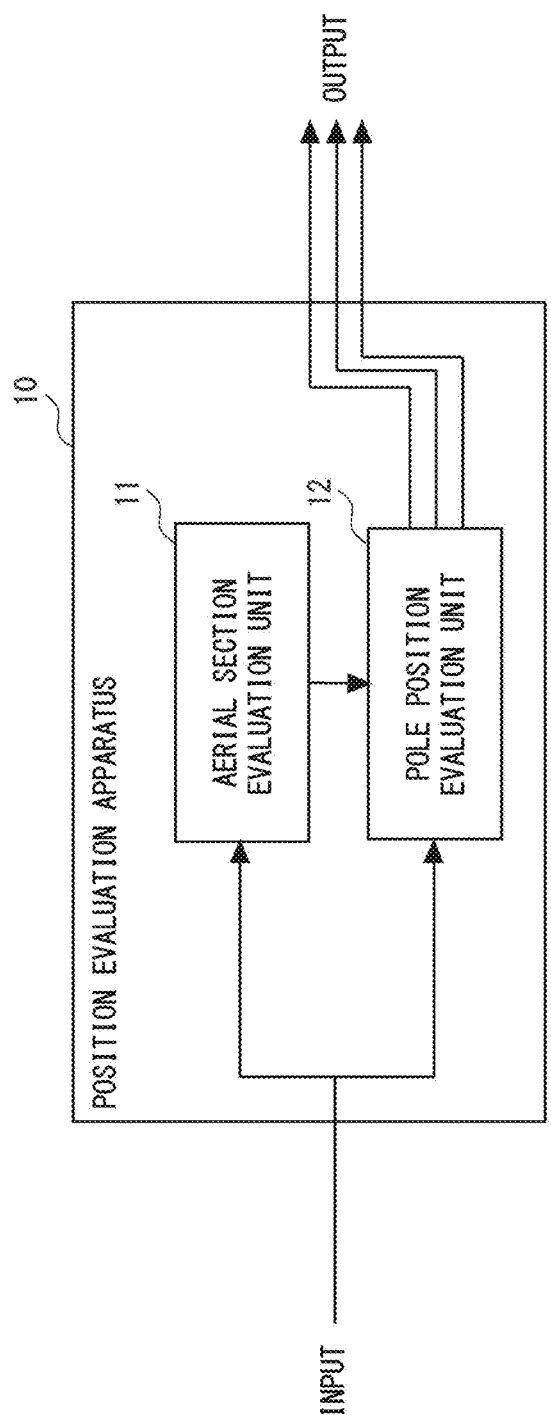
FIG. 6 is a diagram illustrating a configuration example of the position evaluation apparatus according to the first example embodiment.

To begin with, referring to FIG. 6, a configuration example of a position evaluation apparatus 10 according to the first example embodiment is described.

As illustrated in FIG. 6, the position evaluation apparatus 10 according to the first example embodiment includes an aerial section evaluation unit 11 and a pole position evaluation unit 12.

The aerial section evaluation unit 11 is connected to a DAS (not shown) and inputs, as an input signal, a phase difference signal of backscattering light that is obtained from the DAS. In addition, based on the input signal, the aerial section evaluation unit 11 estimates an aerial section in which an optical fiber that is aerially laid over poles is present, and outputs the aerial section.

The pole position evaluation unit 12 is connected to the DAS (not shown) and inputs, as an input signal, a phase difference signal of backscattering light that is obtained from the DAS, and also inputs an estimation result of the aerial section from the aerial section evaluation unit 11. In addition, based on the input signal in the aerial section, the pole position evaluation unit 12 calculates a difference degree map, estimates the position of a pole by using the difference degree map, and calculates a reliable section of the estimation result of the position of the pole using the difference degree map. The difference degree map means a map in which a difference degree is temporally integrated, and the integrated difference degree is displayed as space-and-time data. Furthermore, the pole position evaluation unit 12 outputs the difference degree map, the estimation result of the position of the pole using the difference degree map, and the reliable section of the estimation result of the position of the pole using the difference degree map.

Figure 7:
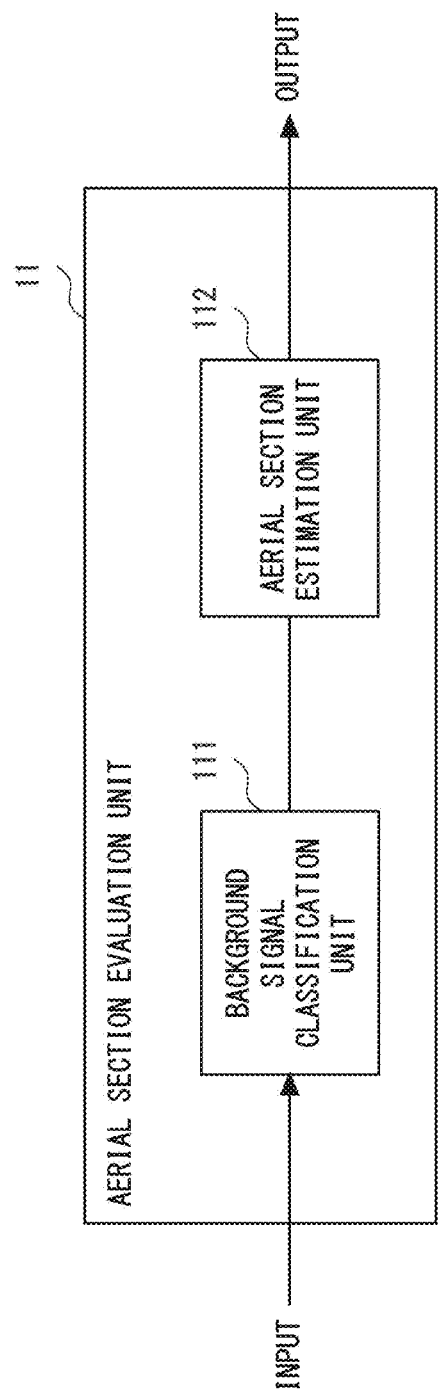
FIG. 7 is a diagram illustrating a configuration example of an aerial section evaluation unit according to the first example embodiment.

Next, referring to FIG. 7, a configuration example of the aerial section evaluation unit 11 according to the first example embodiment is described.

As illustrated in FIG. 7, the aerial section evaluation unit 11 according to the first example embodiment includes a background signal classification unit 111 and an aerial section estimation unit 112.

The background signal classification unit 111 inputs, as an input signal, a phase difference signal of backscattering light from the DAS. In addition, based on the input signal, the background signal classification unit 111 classifies a background signal and outputs a classification result.

The aerial section estimation unit 112 temporally integrates the classification result of the background signal classified by the background signal classification unit 111, time-averages the classification result by an integration time, and executes a threshold process on the time average value of the classification result, thereby classifying an aerial section and a non-aerial section. Then, the aerial section estimation unit 112 outputs a classification result between the aerial section and the non-aerial section as an estimation result of the aerial section.

Figure 8:
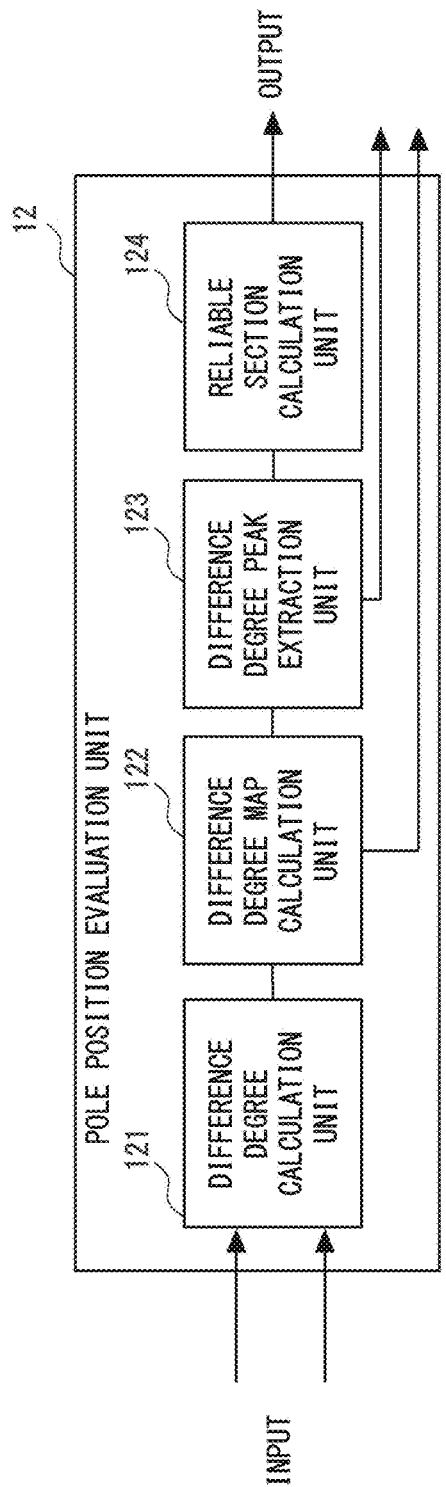
FIG. 8 is a diagram illustrating a configuration example of a pole position evaluation unit according to the first example embodiment.

Next, referring to FIG. 8, a description is given of a configuration example of the pole position evaluation unit 12 according to the first example embodiment.

As illustrated in FIG. 8, the pole position evaluation unit 12 according to the first example embodiment includes a difference degree calculation unit 121, a difference degree map calculation unit 122, a difference degree peak extraction unit 123, and a reliable section calculation unit 124.

The difference degree calculation unit 121 inputs, as an input signal, a phase difference signal of backscattering light from the DAS, and also inputs the estimation result of the aerial section from the aerial section evaluation unit 11. In addition, the difference degree calculation unit 121 calculates a power spectrum in regard to the input signal in the aerial section, and extracts, from the calculated power spectrum, a power spectrum in a dominant frequency band in the aerial section. Furthermore, based on the extracted power spectrum, the difference degree calculation unit 121 calculates a difference degree of two power spectra in an evaluation interval at all DAS coordinate points, and outputs the calculation result of the difference degree.

The difference degree map calculation unit 122 temporally integrates the calculation result of the difference degree calculated by the difference degree calculation unit 121, and smooths the integrated difference degree in a time direction, thereby calculating and outputting a difference degree map.

The difference degree peak extraction unit 123 time-averages the difference degree map calculated by the difference degree map calculation unit 122, estimates a position, where the time average value takes a peak value, as the position of the pole, and outputs the DAS coordinate value corresponding to the estimated position as an estimation result of the position of the pole.

Based on the time average value of the difference degree map calculated by the difference degree peak extraction unit 123, the reliable section calculation unit 124 calculates and outputs a reliable section of the estimation result of the position of the pole, which is estimated by the difference degree peak extraction unit 123.

Hereinafter, the position evaluation apparatus 10 according to the first example embodiment is described in greater detail.

To begin with, an input signal is described.

The DAS inputs pulse light to an optical fiber, and receives backscattering light (Rayleigh scattering light) of the input pulse light from the optical fiber. In addition, by detecting a phase difference of backscattering light occurring at two points on the optical fiber, the DAS can obtain a phase difference signal $$\Delta\varphi(d,t)$$

which indicates the detected phase difference. This phase difference signal is proportional to a dynamic strain of the optical fiber in a phase difference evaluation section (gauge length section) that is a section between the two points. The aerial section evaluation unit 11 and the pole position evaluation unit 12 input this phase difference signal as input signals.

Figure 9:
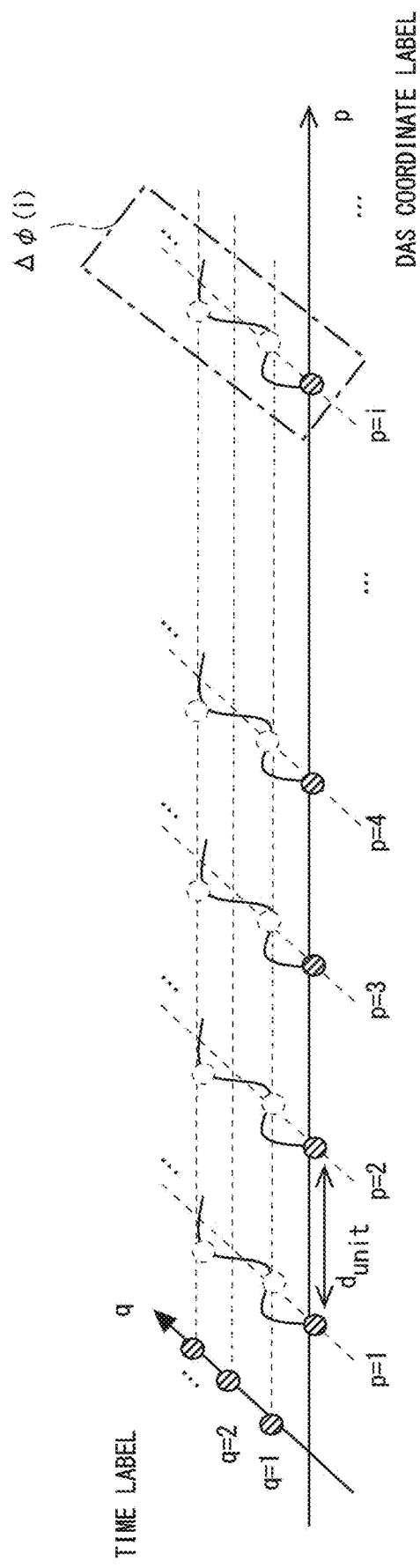
FIG. 9 is a diagram illustrating an example of a phase difference signal that is input as an input signal to the position evaluation apparatus according to the first example embodiment.

Referring to FIG. 9, the phase difference signal is described.

Symbol d in the phase difference signal indicates a distance in the longitudinal direction of the optical fiber from the DAS to a measurement point, and is expressed by the following.

$$d = p \times c/(2 \ast f_{ADC}) = p \times d_{unit}$$

Here, p is a DAS coordinate label (integer). $f_{ADC}$ is a frequency of an ADC (analog-to-digital converter) provided in the DAS. Symbol c is a light velocity in the optical fiber, and is expressed by $c=c_0/n$. Symbol $c_0$ is a light velocity in a vacuum, and n is a refractive index of an optical fiber core (about 1.46 in a case of a core of quarts glass). $d_{unit}$ is an interval of discrete points in a spatial direction. For example, if $f_{ADC}$ is 125 MHz, $d_{unit}$ is about 0.82 m.

In addition, t in the phase difference signal indicates a measurement time, and is expressed by the following.

$$t = q \times \frac{1}{f_{Pulse}}$$

Here, q is a label (integer) of a time interval. $f_{Pulse}$ is a frequency at which the DAS outputs pulse light to the optical fiber.

The gauge length is given as indicated below, in accordance with the setting of the DAS.

$$G = g d_{unit}$$

Here, g is an integer value.

From the above, the phase difference signal is expressed by the following.

$$\Delta\varphi(d,t) = \Delta\varphi(p,q) = [\varphi(p,q) - \varphi(p-g,q)] - \varphi_0 = \Delta\varphi(p)$$

Here, $$\Delta\varphi(p)$$

is a vector representing time-series data at a certain DAS coordinate.

Subsequently, referring to FIG. 10, a description is given of an example of an analysis method of the difference degree by the pole position evaluation unit 12.

The pole position evaluation unit 12 calculates a difference degree D(p) between a power spectrum $$\widetilde{\Delta\varphi}(p)$$

and a power spectrum $$\widetilde{\Delta\varphi}(p+a)$$

as indicated below.

$$D(p) = \left(1 - \frac{\widetilde{\Delta\varphi}(p) \cdot \widetilde{\Delta\varphi}(p+a)}{[\|\widetilde{\Delta\varphi}(p)\|\|\widetilde{\Delta\varphi}(p+a)\|]}\right)/2$$

Here, a is an evaluation interval of the difference degree. For example, if $$\widetilde{\Delta\varphi}(p)$$

and $$\widetilde{\Delta\varphi}(p+a)$$

are power spectra of aerial parts, and the aerial parts do not extend across a pole, both power spectra are similar and D(p) takes a value close to 0.

On the other hand, if $$\widetilde{\Delta\varphi}(p)$$

and $$\widetilde{\Delta\varphi}(p+a)$$

are power spectra of aerial parts, and the aerial parts extend across a pole, the similarity between both power spectra decreases and D(p) takes a value close to 1.

Thus, the pole position evaluation unit 12 analyzes the difference degree from the above standpoint.

Figure 10:
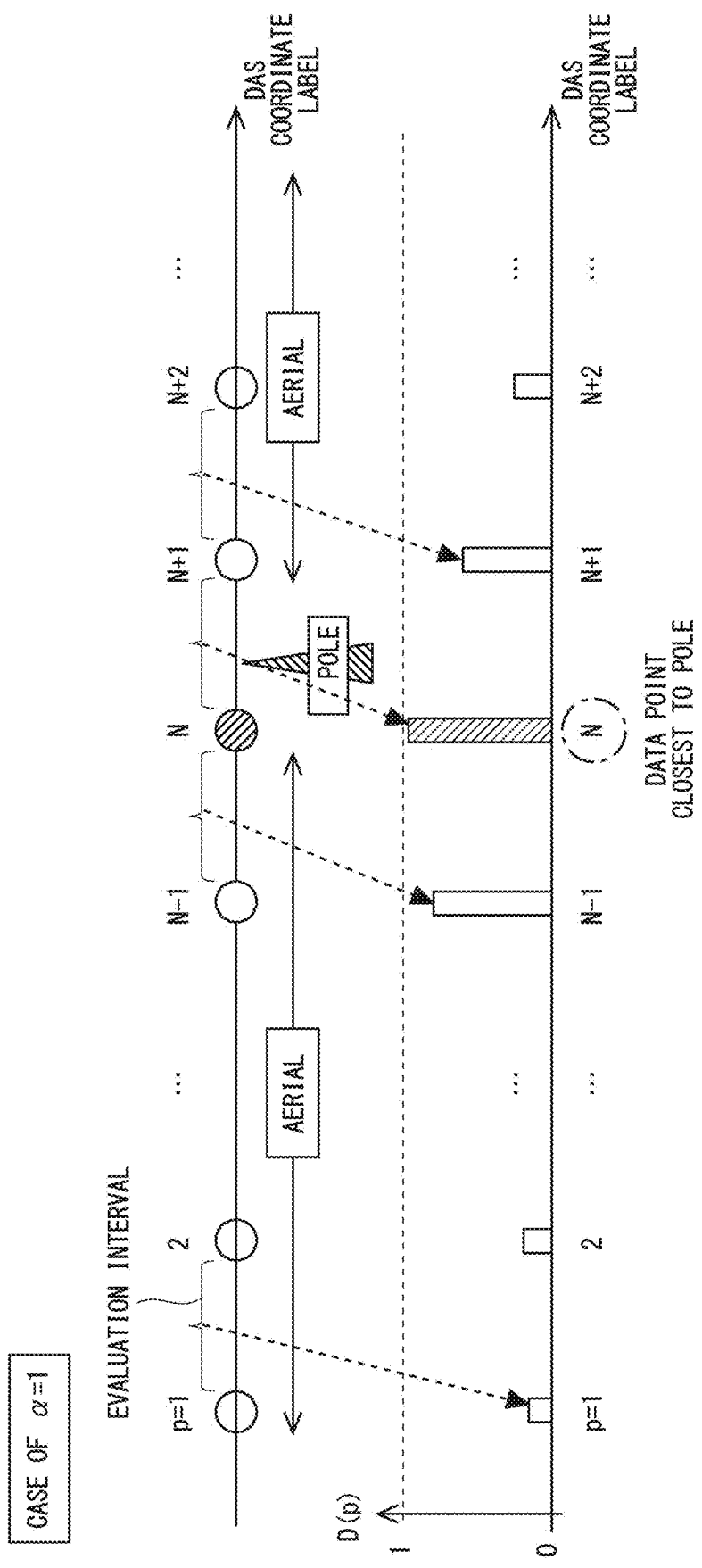
FIG. 10 is a diagram illustrating an example of a difference degree analysis method by the pole position evaluation unit according to the first example embodiment.

FIG. 10 illustrates an example of a case where the evaluation interval a is 1.

In the example of FIG. 10, the pole position evaluation unit 12 estimates a position of p=N, at which D(p) is closest to 1, i.e., a position of p=N at which the difference degree takes a peak value, as the position of the pole, and outputs a DAS coordinate value corresponding to the estimated position.

Figure 11:
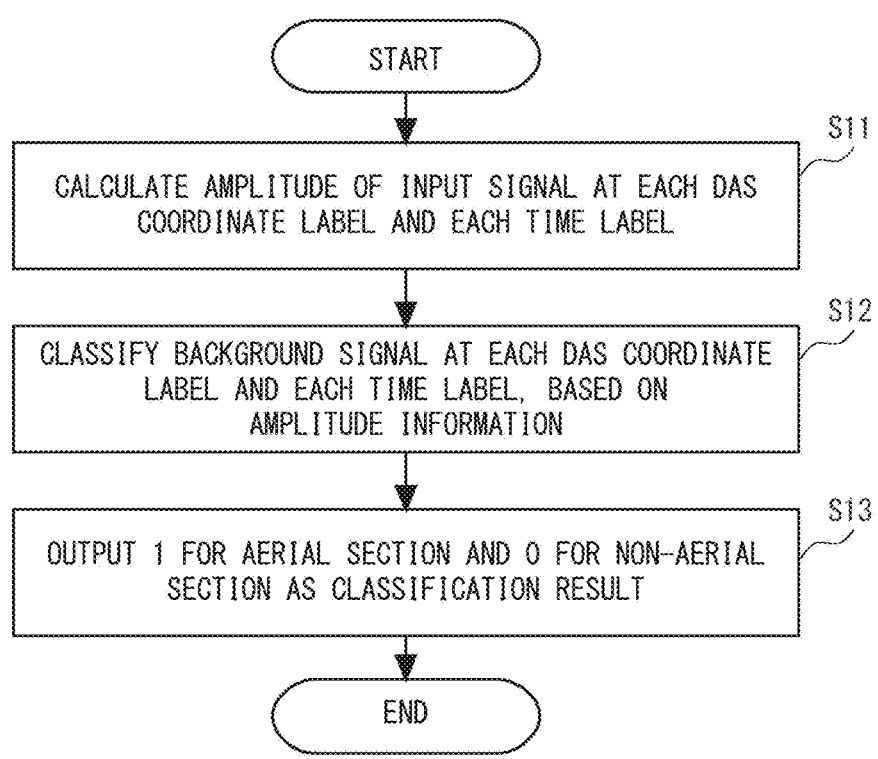
FIG. 11 is a flowchart illustrating an example of a flow of an operation of a background signal classification unit according to the first example embodiment.

Next, referring to FIG. 11, a description is given of an example of a flow of an operation of the background signal classification unit 111.

As illustrated in FIG. 11, to start with, the background signal classification unit 111 calculates an amplitude of an input signal at each DAS coordinate label and each time label (step S11). At this time, before calculating the amplitude of the input signal, the background signal classification unit 111 may limit the frequency band to a dominant frequency band in the aerial section, and may calculate the amplitude of the input signal in the limited band.

Next, based on the amplitude information of the amplitude calculated in step S11, the background signal classification unit 111 classifies the background signal at each DAS coordinate label and each time label (step S12). At this time, for example, the background signal classification unit 111 may create a histogram of the amplitude information, and may classify the background signal, based on the difference of distribution information of the histogram. For example, the background signal classification unit 111 may fit the histogram by a mixed Gaussian distribution, and may classify the background signal into the aerial section or non-aerial section, based on an average value or a standard deviation of each distribution.

Thereafter, the background signal classification unit 111 outputs 1 for the aerial section and outputs 0 for the non-aerial section, as a classification result of the background signal (step S13).

Figure 12:
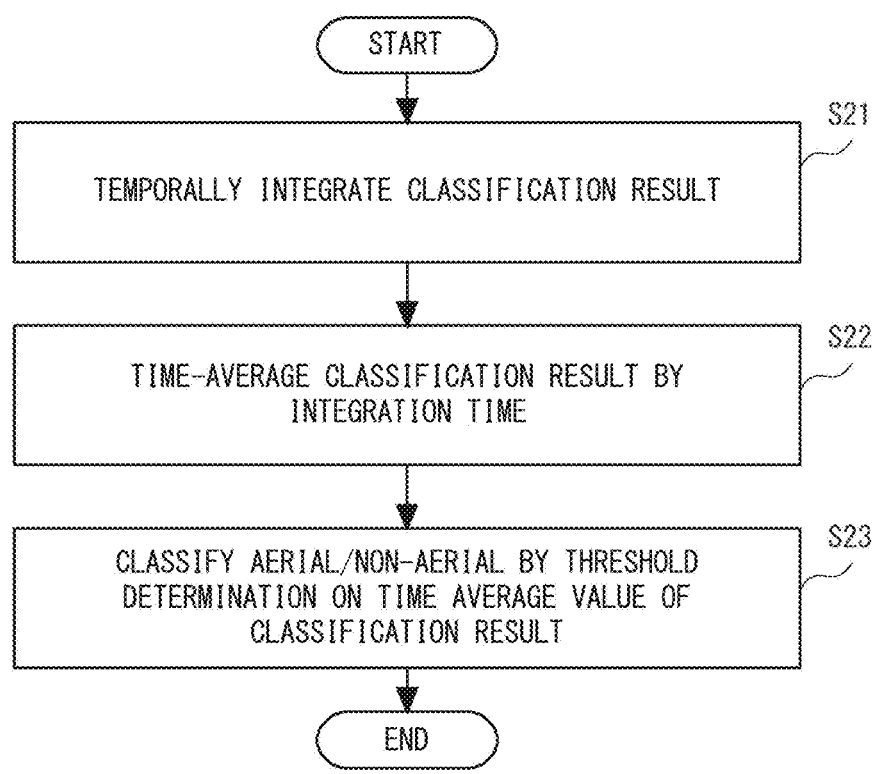
FIG. 12 is a flowchart illustrating an example of a flow of an operation of an aerial section estimation unit according to the first example embodiment.

Next, referring to FIG. 12, a description is given of an example of a flow of an operation of the aerial section estimation unit 112.

As illustrated in FIG. 12, to start with, the aerial section estimation unit 112 temporally integrates the classification result of the background signal classified by the background signal classification unit 111 (step S21).

Next, the aerial section estimation unit 112 time-averages the classification result of the background signal by an integration time (step S22).

Thereafter, the aerial section estimation unit 112 executes a threshold process on the time average value of the classification result of the background signal, thereby classifying an aerial section and a non-aerial section and outputting an estimation result of the aerial section (step S23). Note that a threshold used in the threshold process may be a freely chosen value.

Figure 13:
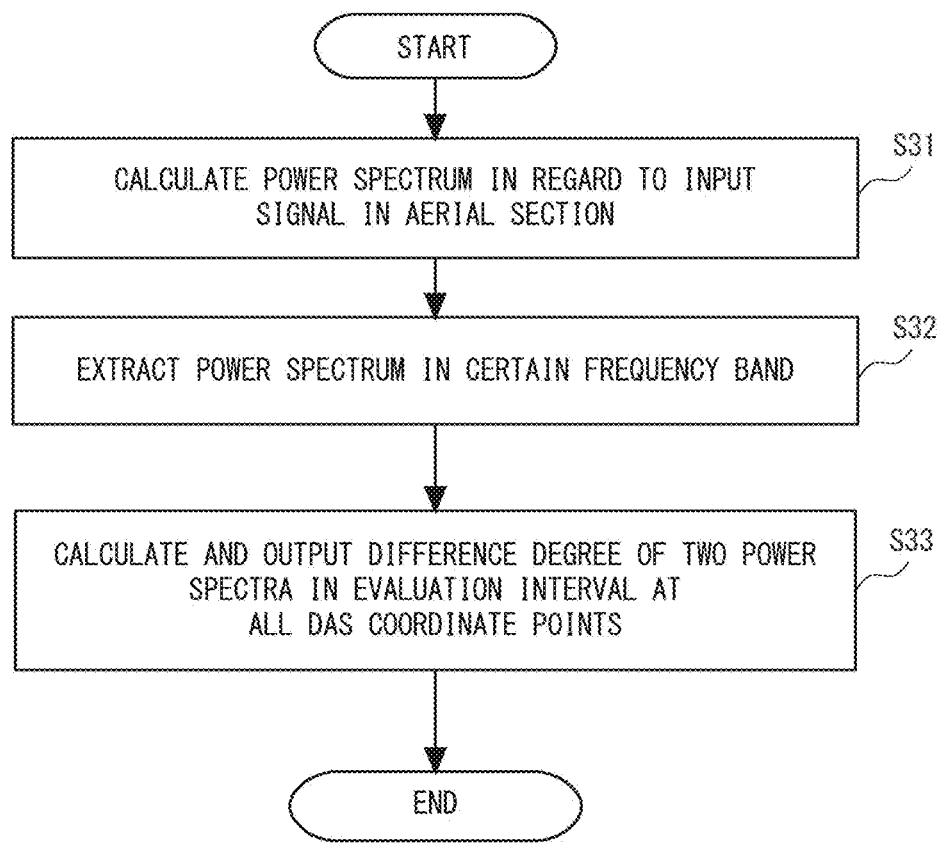
FIG. 13 is a flowchart illustrating an example of a flow of an operation of a difference degree calculation unit according to the first example embodiment.

Next, referring to FIG. 13, a description is given of an example of a flow of an operation of the difference degree calculation unit 121.

As illustrated in FIG. 13, to start with, the difference degree calculation unit 121 extracts an input signal in a certain time slot, among input signals in the aerial section. The input signal in a certain time slot means data that is obtained by cutting out a desired time slot portion of the above-described phase difference signal $$\Delta\varphi(d,t)$$

which is obtained from the DAS. When the cut-out data includes N components in the time direction, the phase difference signal can be expressed as indicated below, as an N-dimensional vector.

$$\Delta\varphi(p)$$

Furthermore, the difference degree calculation unit 121 calculates a power spectrum in regard to the above extracted input signal. Concretely, the difference degree calculation unit 121 executes Fourier transform of $$\Delta\varphi(p)$$

and calculates an absolute value (power spectrum) of the obtained Fourier component (step S31).

$$\widetilde{\Delta\varphi}(p)$$

Next, the difference degree calculation unit 121 extracts a power spectrum in a dominant frequency band from the power spectrum calculated in step S31 (step S32). The dominant frequency band is a frequency band including a fundamental vibration mode in the aerial section of the optical fiber. For example, when a peak value of a power spectrum is observed in the neighborhood of 40 Hz, the difference degree calculation unit 121 extracts a power spectrum in a frequency band of 30-50 Hz.

Thereafter, based on the power spectrum extracted in step S32, the difference degree calculation unit 121 calculates the difference degree of two power spectra in the evaluation interval at all DAS coordinate points, and outputs the difference degree (step S33).

Subsequently, referring to FIG. 14, a description is given of an example of a flow of an operation of the difference degree map calculation unit 122.

Figure 14:
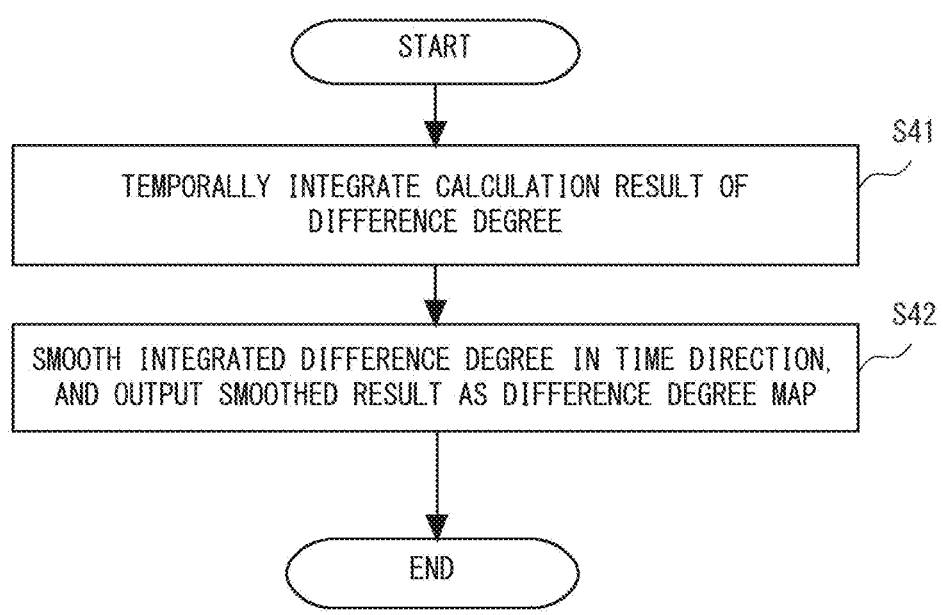
FIG. 14 is a flowchart illustrating an example of a flow of an operation of a difference degree map calculation unit according to the first example embodiment.

As illustrated in FIG. 14, to start with, the difference degree map calculation unit 122 temporally integrates the calculation result of the difference degree calculated by the difference degree calculation unit 121 (step S41).

Thereafter, the difference degree map calculation unit 122 smooths the integrated difference degree, which is integrated in step S41, in a time direction, thereby calculating and outputting a difference degree map (step S42). For example, the difference degree map calculation unit 122 smooths the difference degree by using a moving average filter or a median filter.

Figure 15:
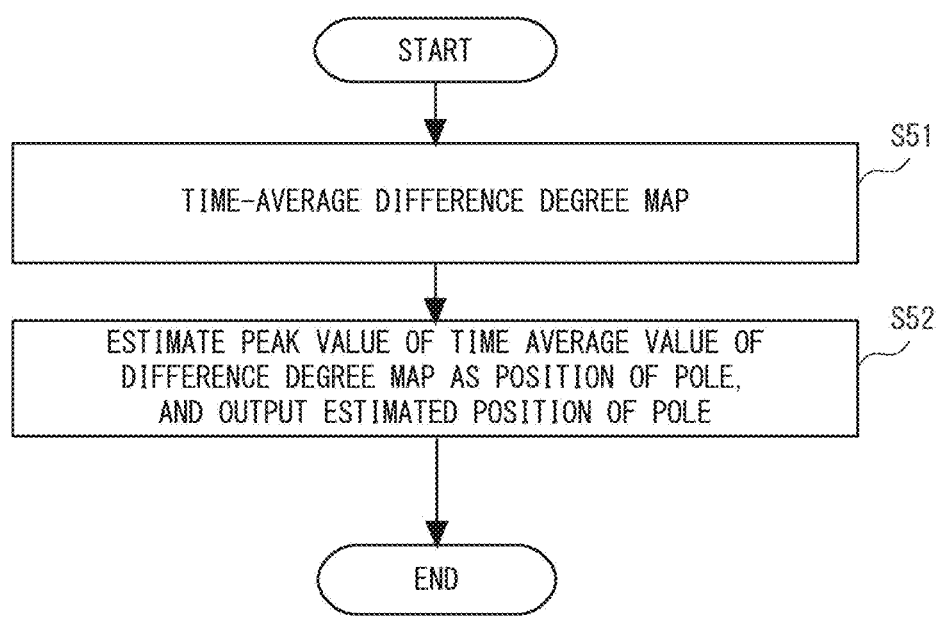
FIG. 15 is a flowchart illustrating an example of a flow of an operation of a difference degree peak extraction unit according to the first example embodiment.

Next, referring to FIG. 15, a description is given of an example of a flow of an operation of the difference degree peak extraction unit 123.

As illustrated in FIG. 15, to start with, the difference degree peak extraction unit 123 time-averages the difference degree map calculated by the difference degree map calculation unit 122 (step S51).

Then, the difference degree peak extraction unit 123 estimates a position, where the time average value calculated in step S51 takes a peak value, as the position of the pole, and outputs the DAS coordinate value corresponding to the estimated position as an estimation result of the position of the pole (step S52). For example, when detecting the peak value, the difference degree peak extraction unit 123 uses, as an analysis window, a minimum length (for example, about 10 m or less) of one span of the optical fiber that is aerially laid over the poles. In addition, when the number of poles, whose positions are to be estimated, is known, it is preferable that the difference degree peak extraction unit 123 limits the number of peaks to be detected to the number of poles.

Figure 16:
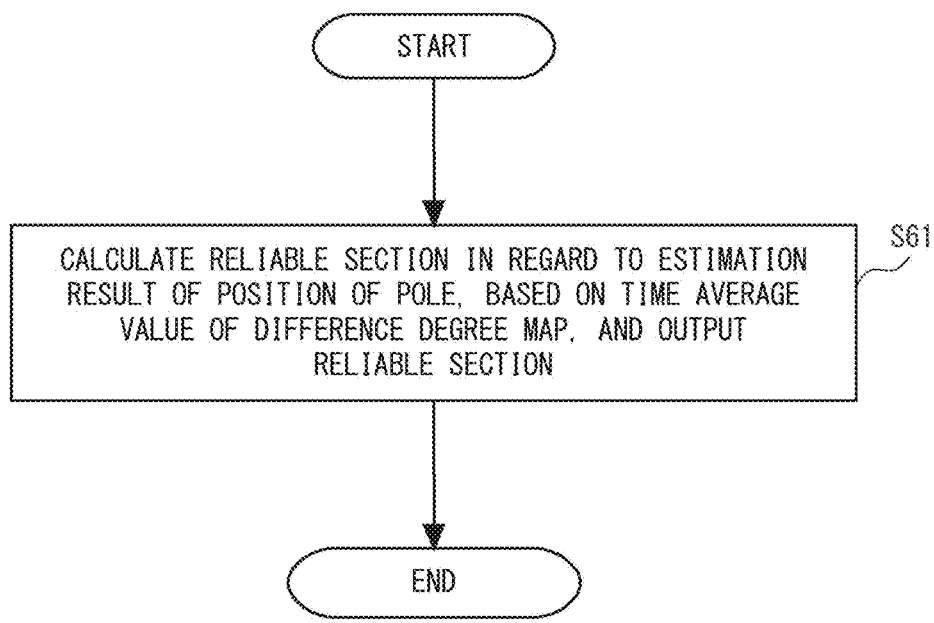
FIG. 16 is a flowchart illustrating an example of a flow of an operation of a reliable section calculation unit according to the first example embodiment.

Next, referring to FIG. 16, a description is given of an example of a flow of an operation of the reliable section calculation unit 124.

As illustrated in FIG. 16, based on the time average value of the difference degree map calculated by the difference degree peak extraction unit 123, the reliable section calculation unit 124 calculates and outputs a reliable section of the estimation result of the position of the pole, which is estimated by the difference degree peak extraction unit 123 (step S61). For example, using the estimation result of each pole position, the reliable section calculation unit 124 fits the time average value of the difference degree map by a plurality of normal distributions, and calculates the reliable section, based on a spatial spread of the normal distributions.

Subsequently, a description is given of a concrete example of the operation of the position evaluation apparatus 10 according to the first example embodiment.

Figure 17:
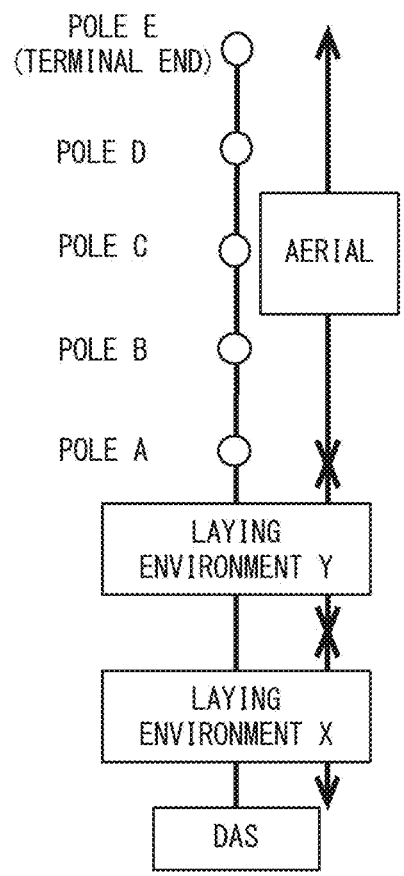
FIG. 17 is a diagram illustrating an example of an aerial section and a laying environment in the vicinity thereof, which are assumed in a concrete example of an operation of the position evaluation apparatus according to the first example embodiment.
Figure 18:
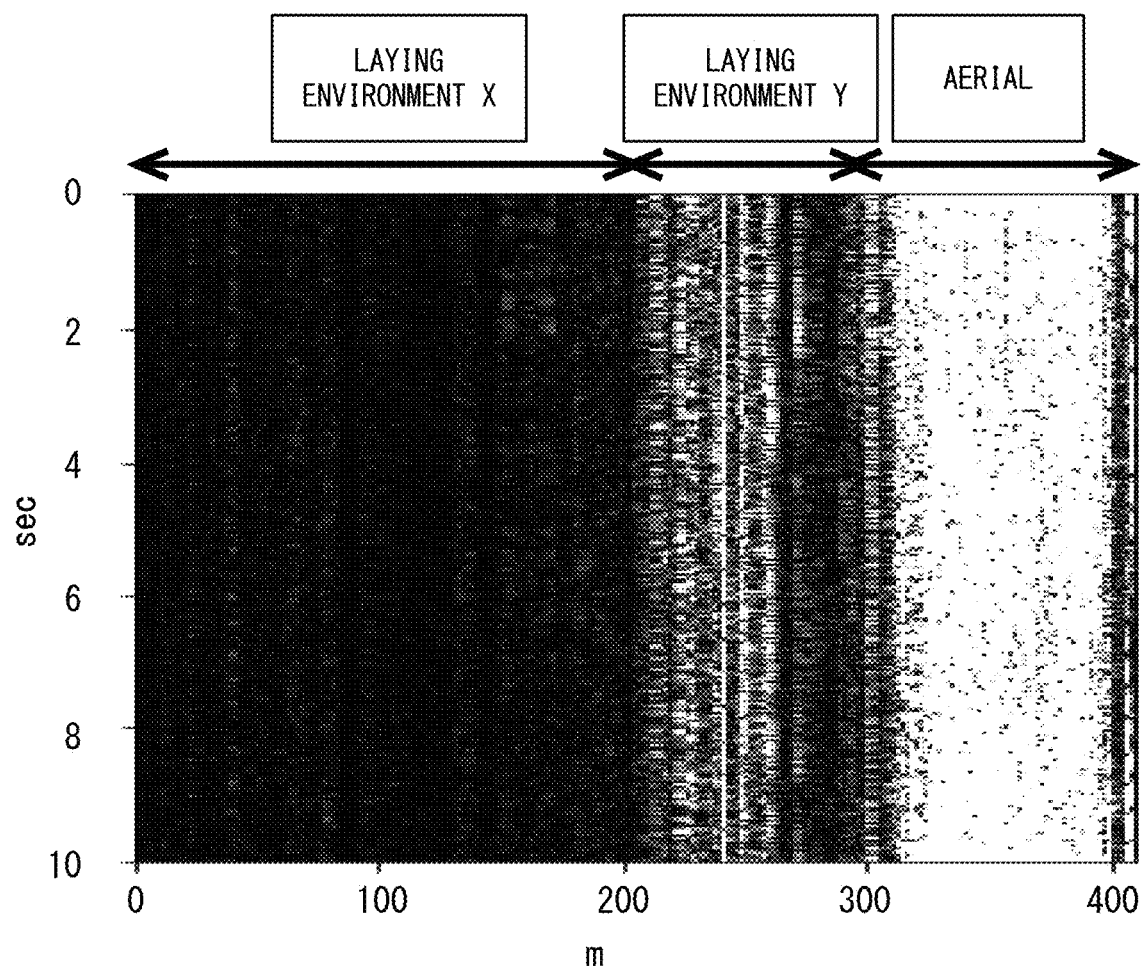
FIG. 18 is a diagram illustrating an example of an aerial section and a laying environment in the vicinity thereof, which are assumed in a concrete example of an operation of the position evaluation apparatus according to the first example embodiment.

In the present concrete example, as illustrated in FIG. 17 and FIG. 18, it is assumed that the positions of five utility poles are estimated by using a DAS. In addition, it is assumed that the optical fiber terminates at the last fifth pole, as viewed from the DAS.

Besides, it is assumed that two different laying environments are present in the vicinity of the aerial section. Specifically, it is assumed that laying environments X and Y, which are non-aerial sections, are present between the DAS and the aerial section.

Figure 19:
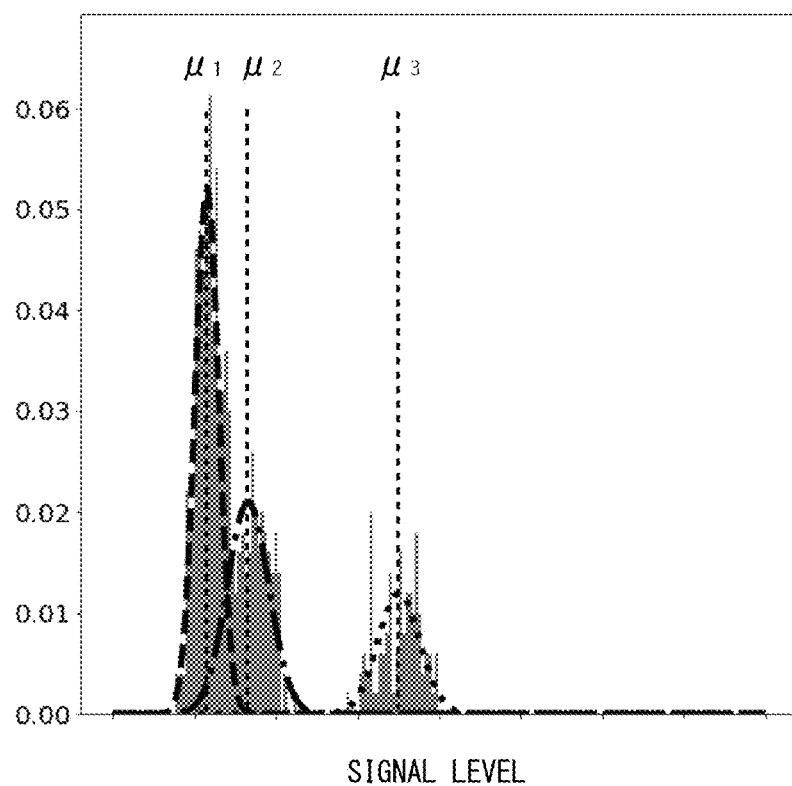
FIG. 19 is a diagram illustrating an example of a histogram, which is obtained in a concrete example of an operation of the position evaluation apparatus according to the first example embodiment.
Figure 20:
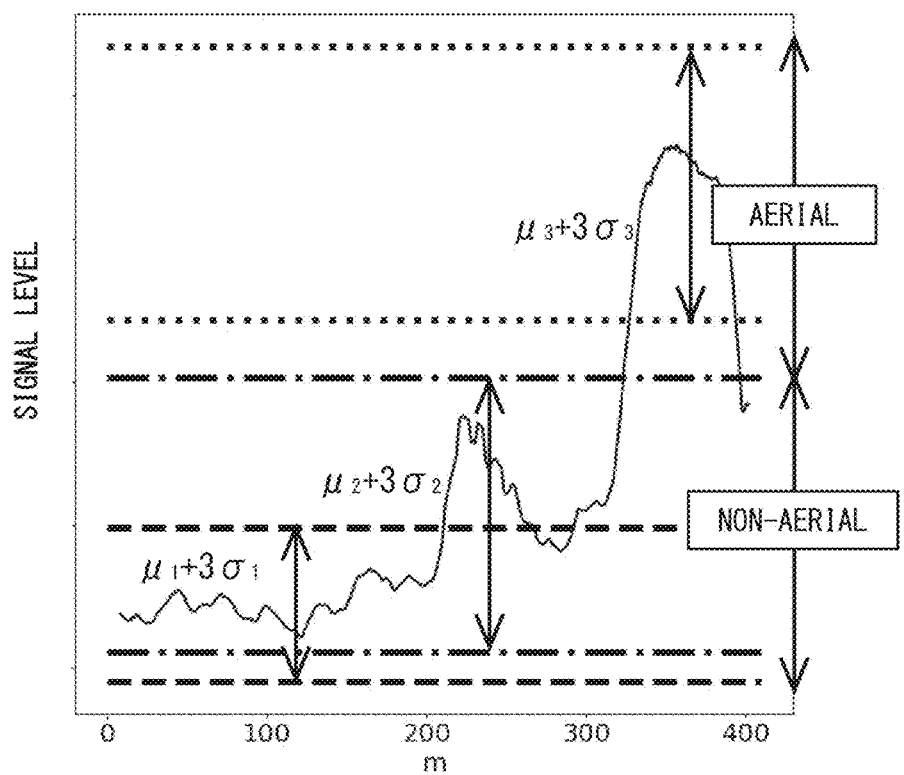
FIG. 20 is a diagram illustrating an example of a signal level characteristic, which is obtained in a concrete example of an operation of the position evaluation apparatus according to the first example embodiment.

To begin with, referring to FIG. 19 and FIG. 20, a description is given of a concrete example of the operation of the background signal classification unit 111.

To start with, the background signal classification unit 111 calculates an amplitude at each DAS coordinate label and each time label in regard to an input signal of ten seconds, represents the magnitude of the calculated amplitude by a histogram, and obtains a histogram as illustrated in FIG. 19. In FIG. 19, the abscissa axis is a signal level representing the magnitude of the amplitude, and the ordinate axis is a frequency. Specifically, the signal level shown in FIG. 19 is a value obtained by applying a moving average filter with a width of 16 m in a DAS coordinate direction. In addition, FIG. 20 illustrates an example of a signal level characteristic at a certain time label. In FIG. 20, the abscissa axis is a DAS coordinate label, and the ordinate axis is a signal level.

Next, using a mixed Gaussian model, the background signal classification unit 111 executes clustering at each DAS coordinate label and each time label. Here, the background signal classification unit 111 classifies a section exceeding $\mu_2+3\sigma_2$ into an aerial section.

Thereafter, the background signal classification unit 111 outputs 1 for the aerial section and outputs 0 for the non-aerial section, as a classification result of the background signal, at each DAS coordinate label and each time label.

Figure 21:
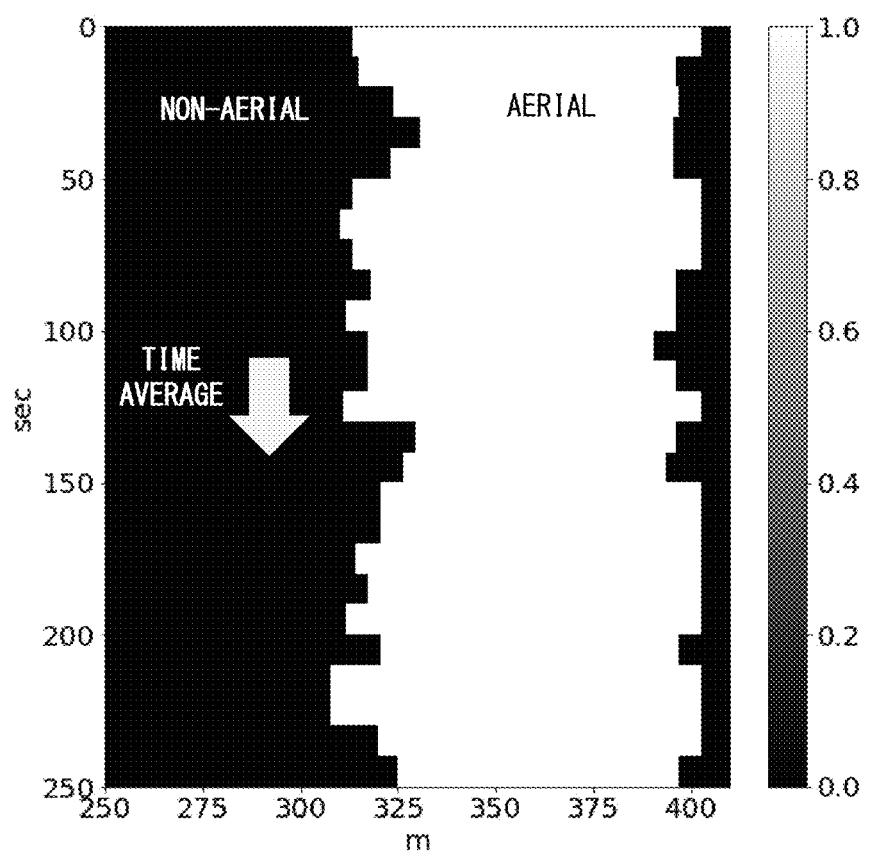
FIG. 21 is a diagram illustrating an example of an integration result, in which a classification result of a background signal is temporally integrated, the integration result being obtained in a concrete example of an operation of the position evaluation apparatus according to the first example embodiment.
Figure 22:
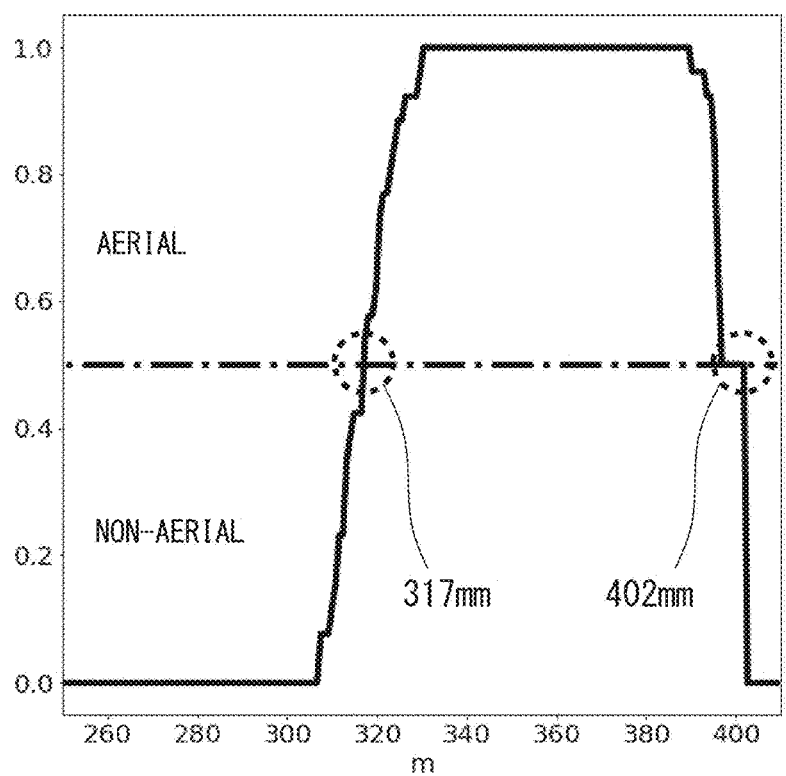
FIG. 22 is a diagram illustrating an example of a time average value of a classification result of a background signal, which is obtained in a concrete example of an operation of the position evaluation apparatus according to the first example embodiment.

Next, referring to FIG. 21 and FIG. 22, a description is given of a concrete example of the operation of the aerial section estimation unit 112.

FIG. 21 illustrates a classification result of a background signal at each DAS coordinate label and each time label. In FIG. 21, the abscissa axis is a DAS coordinate label, and the ordinate axis is a time label.

To start with, the aerial section estimation unit 112 temporally integrates classification results at each DAS coordinate label, with respect to the classification result of the background signal as illustrated in FIG. 21. Furthermore, the aerial section estimation unit 112 time-averages the classification result by the integration time. Thereby, a graph as illustrated in FIG. 22 is obtained. In FIG. 22, the abscissa axis is a DAS coordinate label, and the ordinate axis is a time average value of the classification result.

Next, the aerial section estimation unit 112 executes a threshold process on the time average value of the classification result of the background signal as illustrated in FIG. 22, in regard to each DAS coordinate label, and determines an aerial section if the time average value is a threshold or more. Here, the threshold is set at 0.5.

Thereafter, the aerial section estimation unit 112 estimates, as an aerial section, a section between a left end and a right end, which are determined to be an aerial section. Here, a section with DAS coordinate labels of 317 m to 402 m is estimated as an aerial section.

In this manner, since the time average process is executed to estimate the aerial section, there is an advantage of robustness to an abrupt noise level variation in a non-aerial section.

Figure 23:
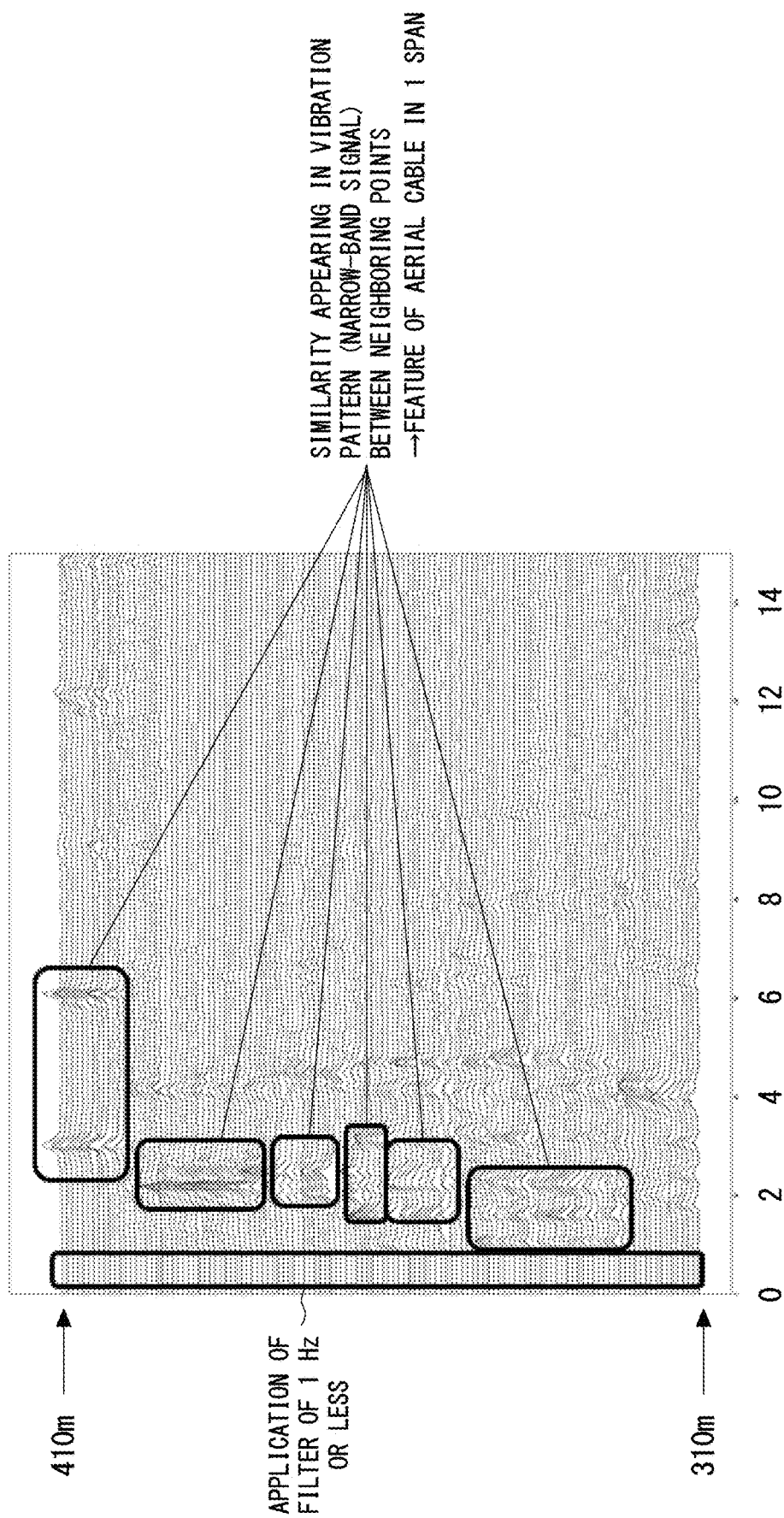
FIG. 23 is a diagram illustrating an example of a power spectrum, which is obtained in a concrete example of an operation of the position evaluation apparatus according to the first example embodiment.

Next, referring to FIG. 23, a description is given of a concrete example of the operation of the difference degree calculation unit 121.

The difference degree calculation unit 121 calculate a power spectrum in regard to the input signal of ten seconds in the aerial section, and extracts, from the calculated power spectrum, a power spectrum of a frequency band of 1 to 15 Hz. Here, the settings are $d_{unit}=0.82$ m, and $g=1$.

Next, using the power spectra, the difference degree calculation unit 121 calculates the difference degree. Here, the setting is $a=2$.

FIG. 23 illustrates an example of the power spectrum obtained from the input signal of ten seconds in the aerial section. In FIG. 23, the abscissa axis is a frequency, and the ordinate axis is a DAS coordinate label.

As illustrated in FIG. 23, in one span of the optical fiber that is aerially laid over poles, vibration patterns (narrowband signals) of power spectra are similar between neighboring points. This feature is a feature in one span of the optical fiber that is aerially laid over poles. In the first example embodiment, the position of each pole is estimated by making use of this feature.

Figure 24:
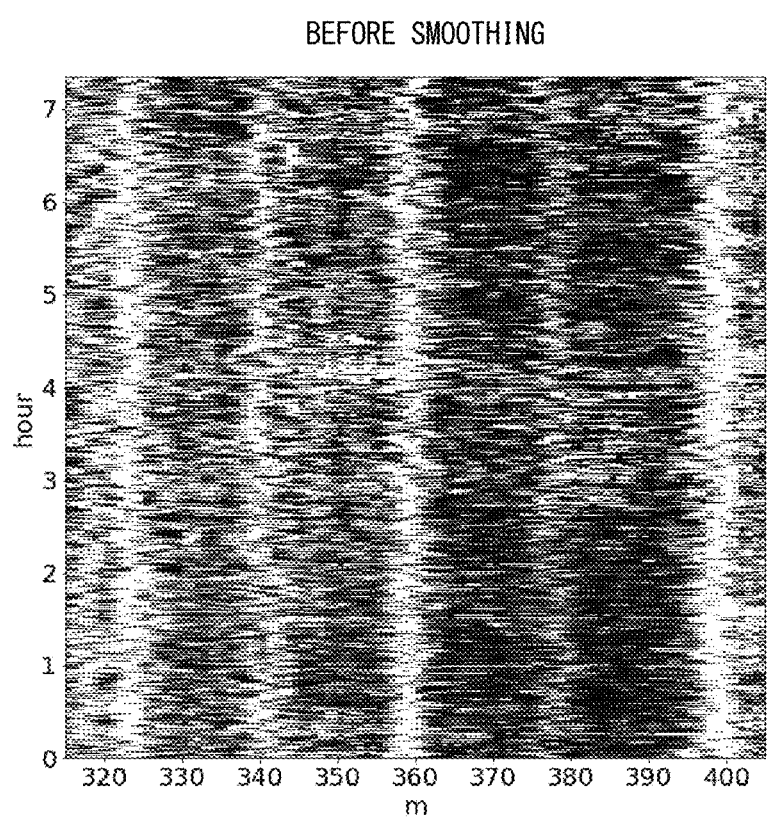
FIG. 24 is a diagram illustrating an example of a difference degree map before smoothing, which is obtained in a concrete example of an operation of the position evaluation apparatus according to the first example embodiment.
Figure 25:
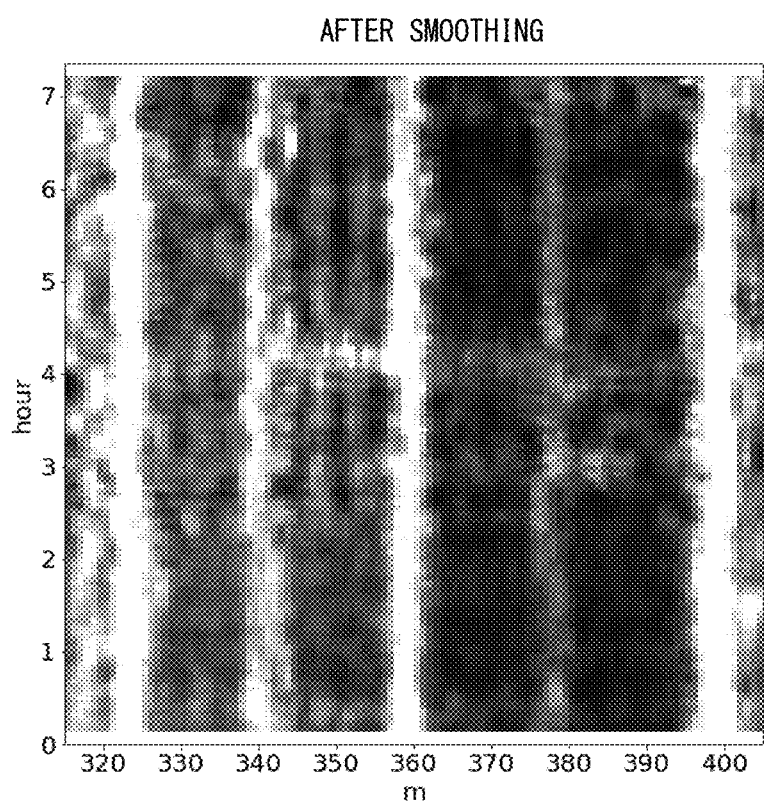
FIG. 25 is a diagram illustrating an example of a difference degree map after smoothing, which is obtained in a concrete example of an operation of the position evaluation apparatus according to the first example embodiment.

Next, referring to FIG. 24 and FIG. 25, a description is given of a concrete example of the operation of the difference degree map calculation unit 122.

The difference degree map calculation unit 122 temporally integrates the calculation result of the difference degree. Thereby, a difference degree map before smoothing, in which the difference degree is visualized, as illustrated in FIG. 24, is obtained. In FIG. 24, the abscissa axis is a DAS coordinate label, and the ordinate axis is a time label (the same applies to FIG. 25 to be described later).

Further, the difference degree map calculation unit 122 smooths the difference degree in the time direction in regard to the difference degree map before smoothing, for example, by using a median filter. Thereby, a difference degree map after smoothing, as illustrated in FIG. 25, is obtained.

Figure 26:
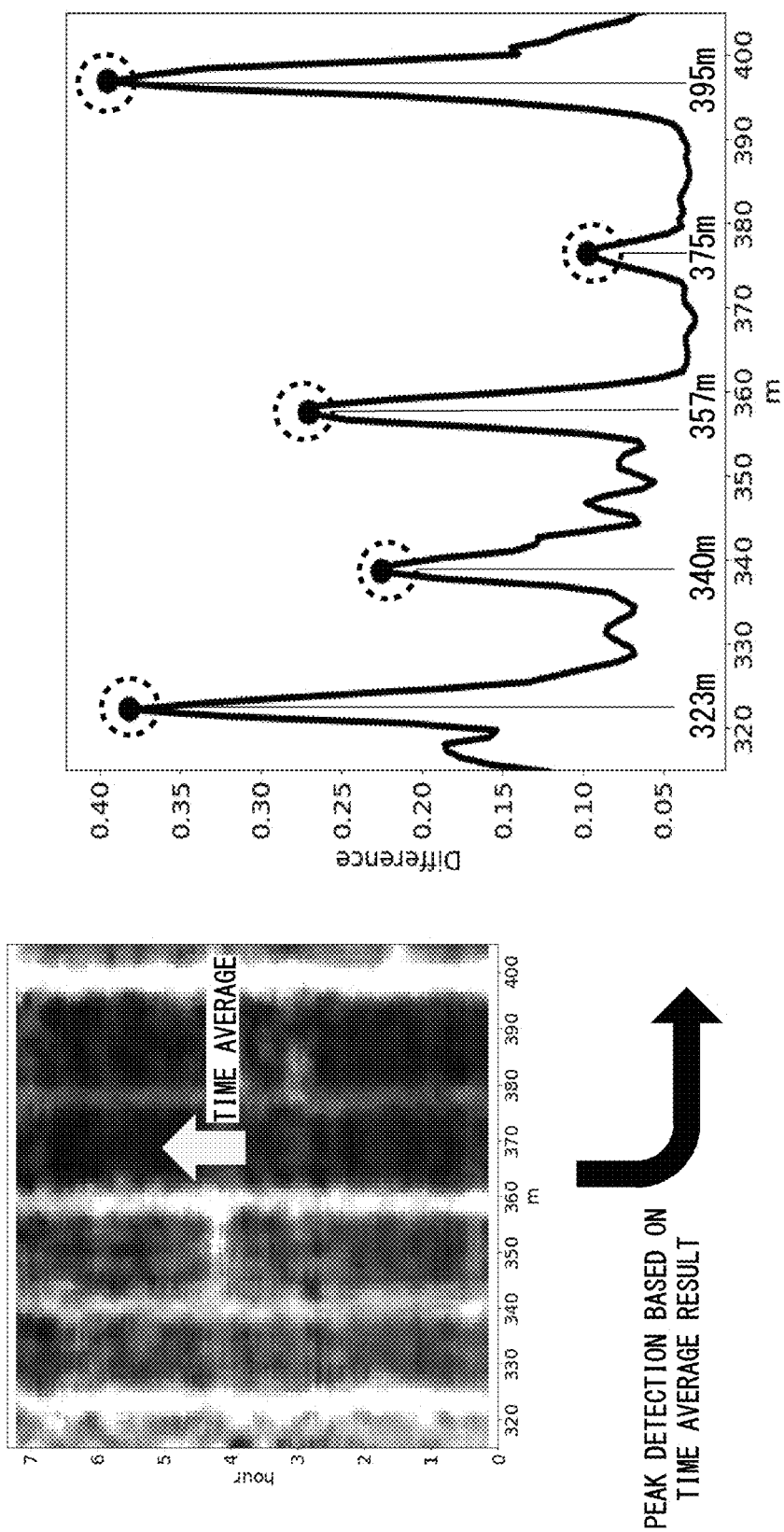
FIG. 26 is a diagram illustrating an example of a peak of a time average value of a difference degree map, which is obtained in a concrete example of an operation of the position evaluation apparatus according to the first example embodiment.

Next, referring to FIG. 26, a description is given of a concrete example of the operation of the difference degree peak extraction unit 123.

The difference degree peak extraction unit 123 time-averages the difference degree map. Thereby, a difference degree characteristic, as illustrated in a right part of FIG. 26, is obtained. In the right part of FIG. 26, the abscissa axis is a DAS coordinate label, and the ordinate axis is a time average value of the difference degree (the same applies to FIG. 27 to be described later).

Furthermore, the difference degree peak extraction unit 123 detects a peak of the time average value. At this time, if a minimum length (for example, about m or less) of one span of the optical fiber that is aerially laid over the poles is used as an analysis window, the detection accuracy of the peak can be improved. Here, since it is understood that the number of poles, whose positions are to be estimated, is five, the number of peaks to be detected is set at five.

In addition, the difference degree peak extraction unit 123 estimates the positions of the five peaks as the positions of the five poles, respectively.

Figure 27:
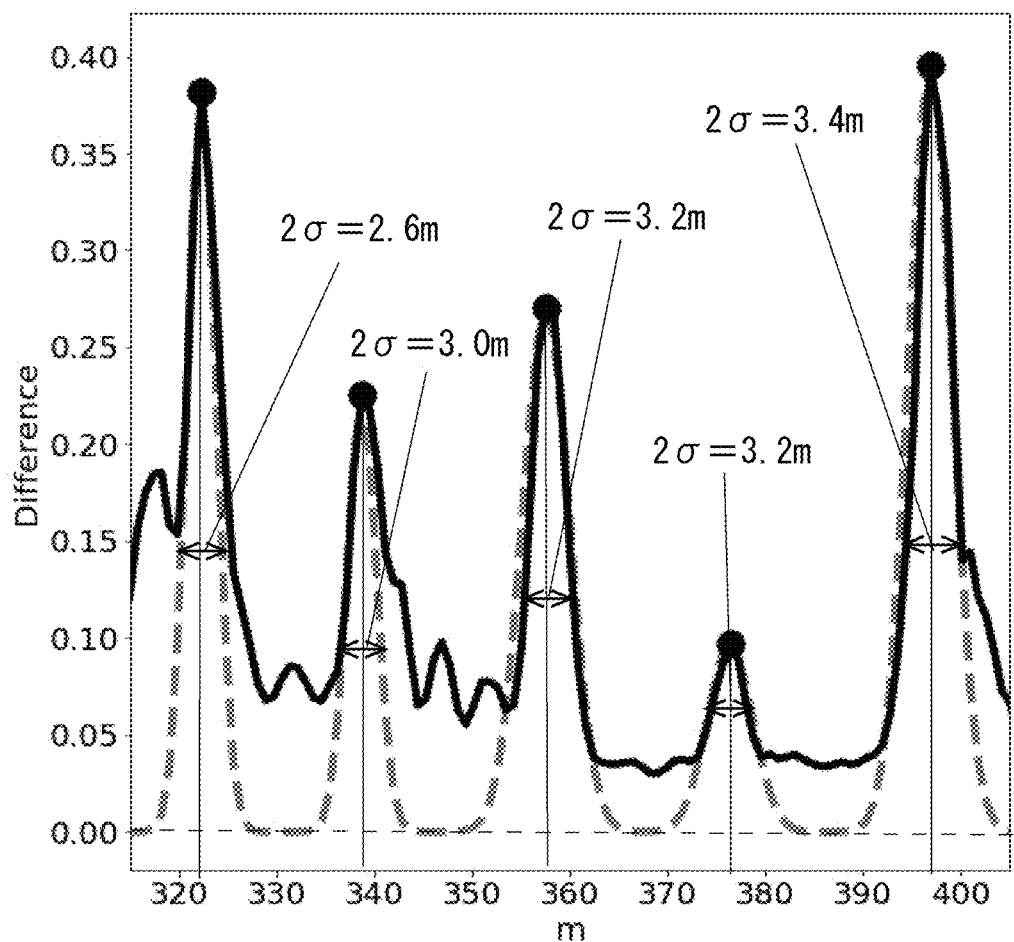
FIG. 27 is a diagram illustrating an example of a reliable section of an estimation result of the position of a pole, which is obtained in a concrete example of an operation of the position evaluation apparatus according to the first example embodiment.

Next, referring to FIG. 27, a description is given of a concrete example of the operation of the reliable section calculation unit 124.

As illustrated in FIG. 27, the reliable section calculation unit 124 calculates a reliable section of the estimation result of the position of the pole, in regard to the neighborhood of the peak of the time average value of the difference degree map.

For example, the reliable section calculation unit 124 optimizes σ of each normal distribution, such that spatial differential values of the difference degree map fit to spatial differential values of the normal distribution. In addition, based on the fitted normal distribution, the reliable section calculation unit 124 defines a section that is reliable, and sets the defined section as a reliable section. Note that a range that is set as a reliable section may be freely chosen.

According to the above-described first example embodiment, the aerial section evaluation unit 11 estimates the aerial section in which the optical fiber aerially laid over the poles is present, based on the input signal that is the phase difference signal of backscattering light. Based on the input signal in the aerial section, the pole position evaluation unit 12 calculates the power spectrum in regard to the input signal, and calculates the difference degree of two power spectra in the evaluation interval. Further, the pole position evaluation unit 12 temporally integrates the calculation result of the difference degree and smooths the integrated difference degree in the time direction, thereby calculating the difference degree map, time-averaging the difference degree map, estimating the position, where the time average value takes a peak value, as the position of the pole, and outputting the estimation result.

Thus, if there is a point where the difference degree of the power spectrum in the evaluation interval becomes maximum, even if this point is not a point where a vibration of maximum strength occurs, this point can be estimated as the position of the pole. In addition, the position of the pole is estimated by limiting the analysis target section to the aerial section. Thereby, the estimation accuracy of the position of the pole can be improved.

Furthermore, according to the first example embodiment, based on the time average value of the difference degree map, the pole position evaluation unit 12 calculates and outputs the reliable section of the estimation result of the position of the pole. Thus, a reliable section, among the estimation results of the position of the pole, can be confirmed.

Besides, according to the first example embodiment, the pole position evaluation unit 12 outputs the difference degree map. Thus, the difference degree can visually be confirmed.

Note that the optical fiber that is aerially laid over poles is easily affected by the wind.

Figure 28:
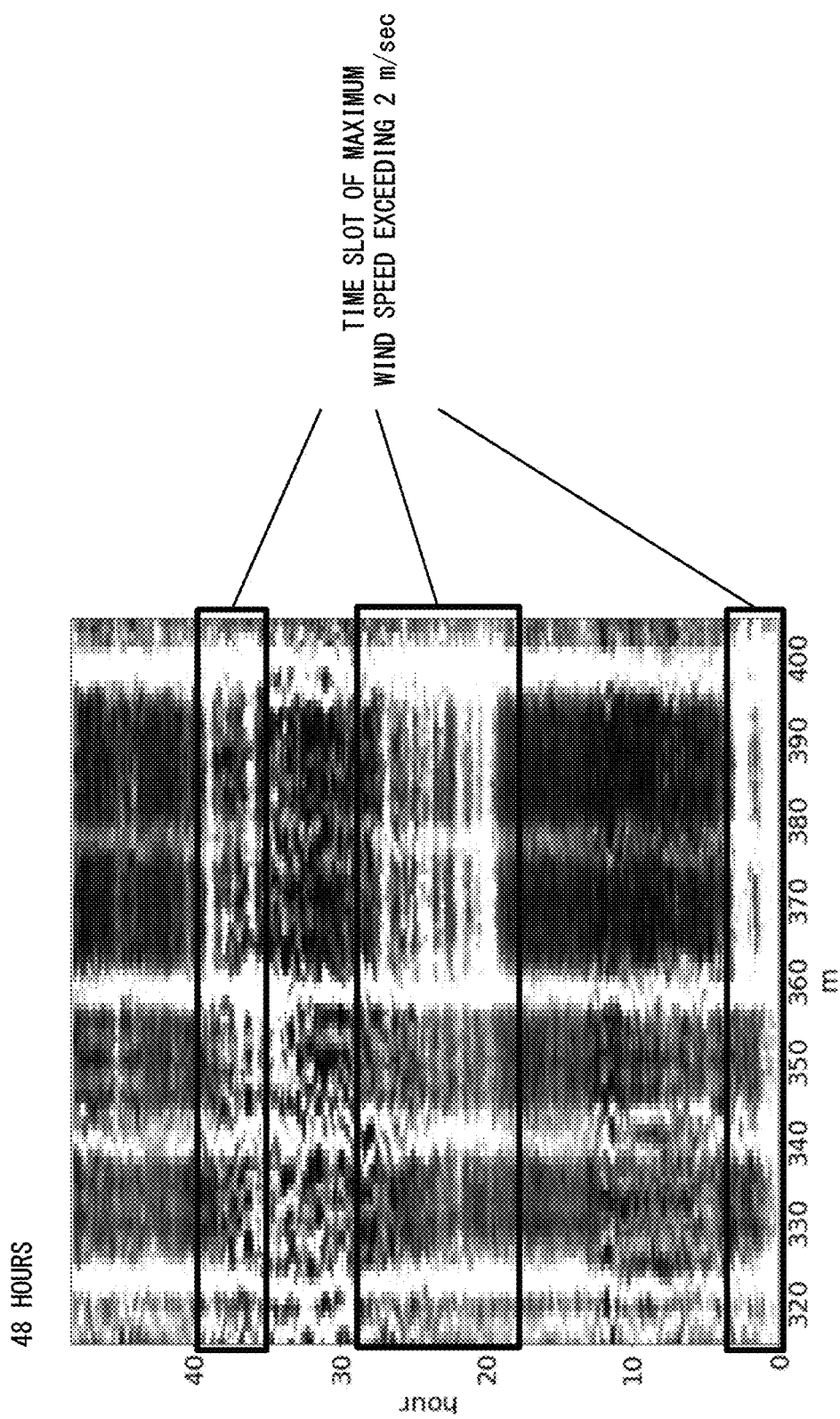
FIG. 28 is a diagram illustrating an example of a difference degree map calculated in a time slot including a time slot when a wind is strong, which is obtained by the position evaluation apparatus according to the first example embodiment.

FIG. 28 illustrates an example of a difference degree map after smoothing, which is calculated in a time slot including a time slot of a strong wind (for example, a time slot in which a maximum wind speed exceeds 2 m/sec).

As illustrated in FIG. 28, in the time slot in which the wind is strong, since the time average value of the difference degree is in an unstable state in the difference degree map, there is concern that the accuracy of the pole position estimation may lower. It is thus preferable that the pole position estimation by the pole position evaluation unit 12 is performed in a day and a time slot in which the wind is weak.

On the other hand, in the time slot in which the wind is strong, since a different between the input signal of the aerial section and the input signal of the non-aerial section becomes clear, it is considered that the estimation accuracy of the aerial section is improved. It is thus preferable that the estimation of the aerial section by the aerial section evaluation unit 11 is performed in a day and a time slot in which the wind is strong.

Second Example Embodiment

Figure 29:
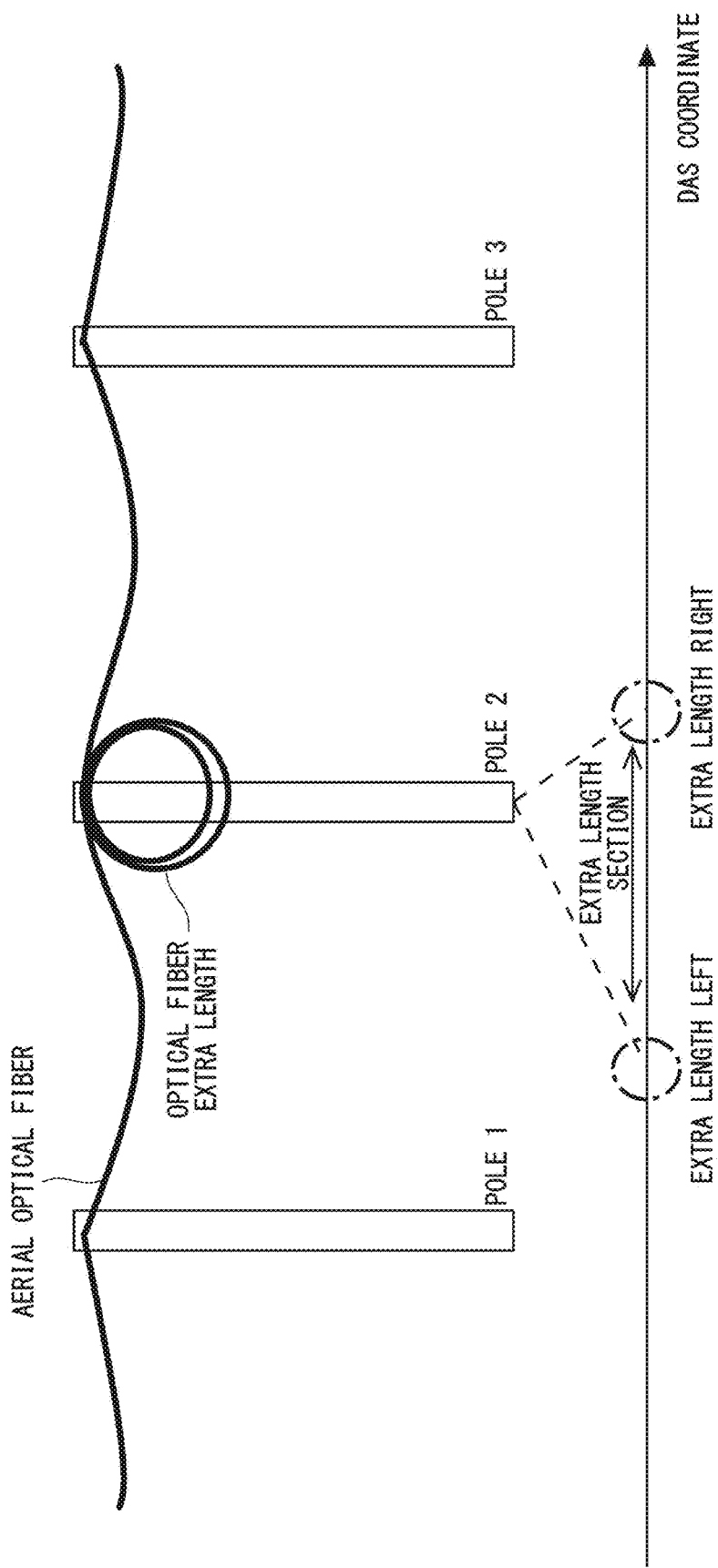
FIG. 29 is a diagram illustrating an applied example of a position evaluation apparatus according to a second example embodiment.

In a second example embodiment, as illustrated in FIG. 29, a position of an extra length section of an optical fiber is estimated and output as a DAS coordinate value. Specifically, a left end and a right end of the extra length of the optical fiber are expressed as an extra length left and an extra length right, and positions of the extra length left and the extra length right are estimated and output as DAS coordinate values.

Figure 30:
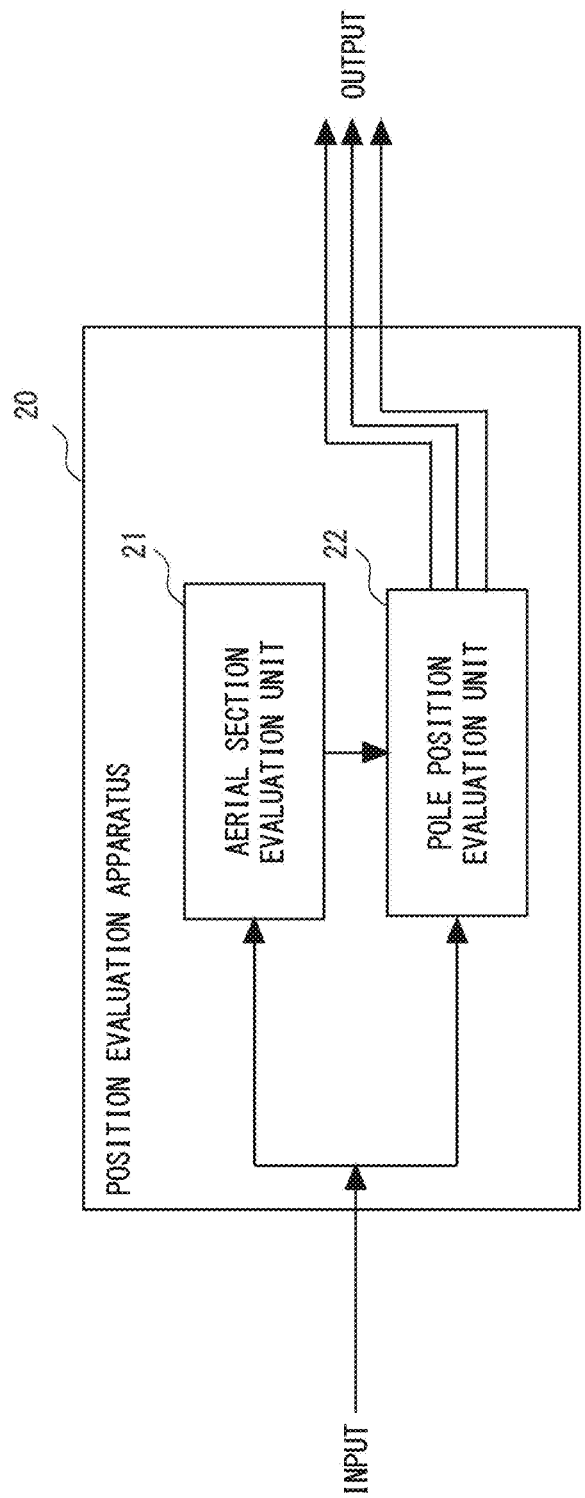
FIG. 30 is a diagram illustrating a configuration example of the position evaluation apparatus according to the second example embodiment.

To begin with, referring to FIG. 30, a configuration example of a position evaluation apparatus 20 according to the second example embodiment is described.

As illustrated in FIG. 30, the position evaluation apparatus 20 according to the second example embodiment includes an aerial section evaluation unit 21 and a pole position evaluation unit 22.

The input signal that is input to the aerial section evaluation unit 21 and pole position evaluation unit 22 is similar to the input signal according to the above-described first example embodiment.

The aerial section evaluation unit 21 is similar to the aerial section evaluation unit 11 according to the first example embodiment.

The pole position evaluation unit 22 is connected to the DAS (not shown) and inputs, as an input signal, a phase difference signal of backscattering light that is obtained from the DAS, and also inputs an estimation result of the aerial section from the aerial section evaluation unit 21. In addition, based on the input signal in the aerial section, the pole position evaluation unit 22 calculates a weighted difference degree map, estimates the positions of the pole, extra length left and extra length right, by using the weighted difference degree map, and calculates a reliable section of the estimation results of the positions of the pole, extra length left and extra length right using the weighted difference degree map. The weighted difference degree map means a map in which a weighted difference degree is temporally integrated, and the weighted difference degree is displayed as space-and-time data. Furthermore, the pole position evaluation unit 22 outputs the weighted difference degree map, the estimation results of the positions of the pole, extra length left and extra length right using the weighted difference degree map, and the reliable section of the estimation results of the positions of the pole, extra length left and extra length right using the weighted difference degree map.

Figure 31:
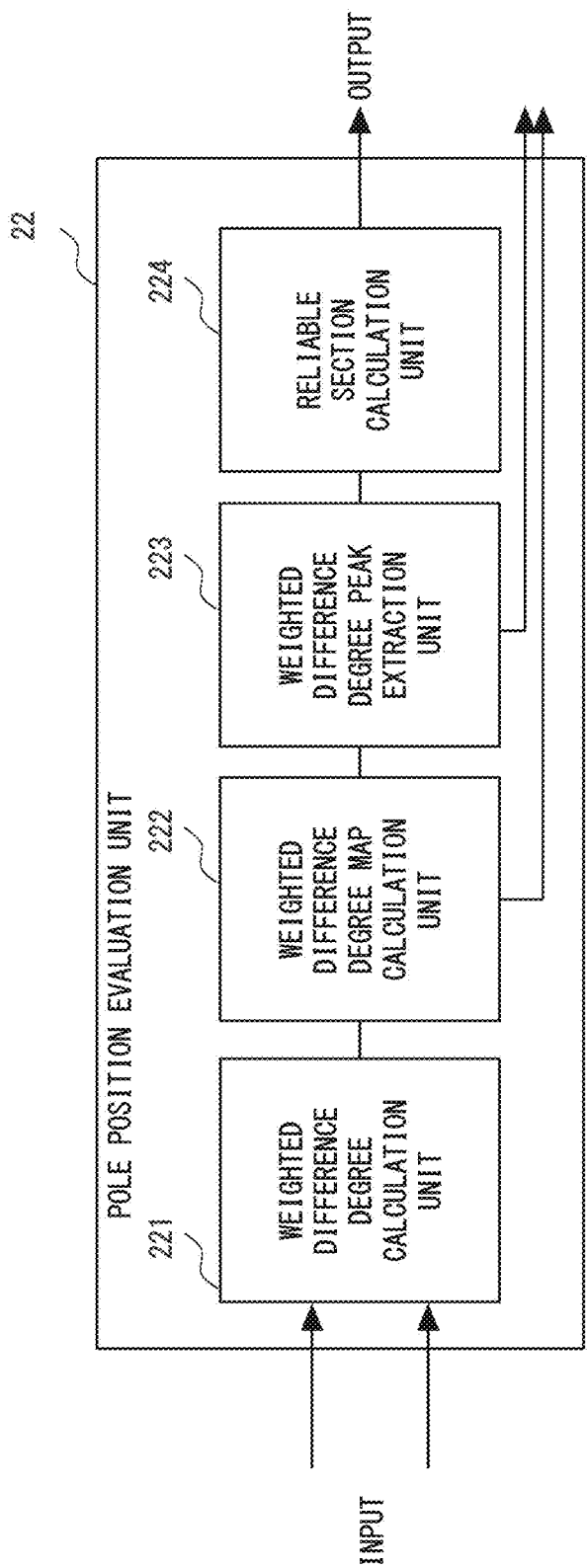
FIG. 31 is a diagram illustrating a configuration example of a pole position evaluation unit according to the second example embodiment.

Next, referring to FIG. 31, a configuration example of the pole position evaluation unit 22 according to the second example embodiment is described.

As illustrated in FIG. 31, the pole position evaluation unit 22 according to the second example embodiment includes a weighted difference degree calculation unit 221, a weighted difference degree map calculation unit 222, a weighted difference degree peak extraction unit 223, and a reliable section calculation unit 224.

The weighted difference degree calculation unit 221 inputs, as an input signal, a phase difference signal of backscattering light from the DAS, and also inputs the estimation result of the aerial section from the aerial section evaluation unit 21. In addition, the weighted difference degree calculation unit 221 calculates a power spectrum in regard to the input signal in the aerial section, and extracts, from the calculated power spectrum, a power spectrum in a dominant frequency band in the aerial section. Furthermore, based on the extracted power spectrum, the weighted difference degree calculation unit 221 calculates a difference degree of two power spectra in an evaluation interval at all DAS coordinate points, and outputs the calculation result of the difference degree. In addition, the weighted difference degree calculation unit 221 calculates a frequency average value of the extracted power spectrum at all DAS coordinate points. Besides, the weighted difference degree calculation unit 221 calculates a weighted difference degree, which is obtained by weighting the difference degree by the frequency average value of the power spectrum, at all DAS coordinate points, and outputs the weighted difference degree.

The weighted difference degree map calculation unit 222 temporally integrates the calculation result of the weighted difference degree calculated by the weighted difference degree calculation unit 221, and smooths the integrated weighted difference degree in a time direction, thereby calculating and outputting a weighted difference degree map.

The weighted difference degree peak extraction unit 223 time-averages the weighted difference degree map calculated by the weighted difference degree map calculation unit 222, estimates a position, where the time average value takes a peak value, as the position of the pole, and outputs the DAS coordinate value corresponding to the estimated position as an estimation result of the position of the pole.

In addition, the weighted difference degree peak extraction unit 223 sets an extra length section range on the DAS coordinate, based on the frequency average value of the power spectrum at all DAS coordinate points obtained by the weighted difference degree calculation unit 221. Furthermore, the weighted difference degree peak extraction unit 223 estimates positions in the extra length section range, where the time average value takes peak values, as the positions of the extra length left and the extra length right, and outputs DAS coordinate values corresponding to the estimated positions as the estimation results of the positions of the extra length left and the extra length right.

Based on the time average value of the weighted difference degree map calculated by the weighted difference degree peak extraction unit 223, the reliable section calculation unit 224 calculates and outputs a reliable section of the estimation results of the positions of the pole, extra length left and extra length right, which are estimated by the weighted difference degree peak extraction unit 223.

Hereinafter, the position evaluation apparatus 20 according to the second example embodiment is described in greater detail.

Figure 32:
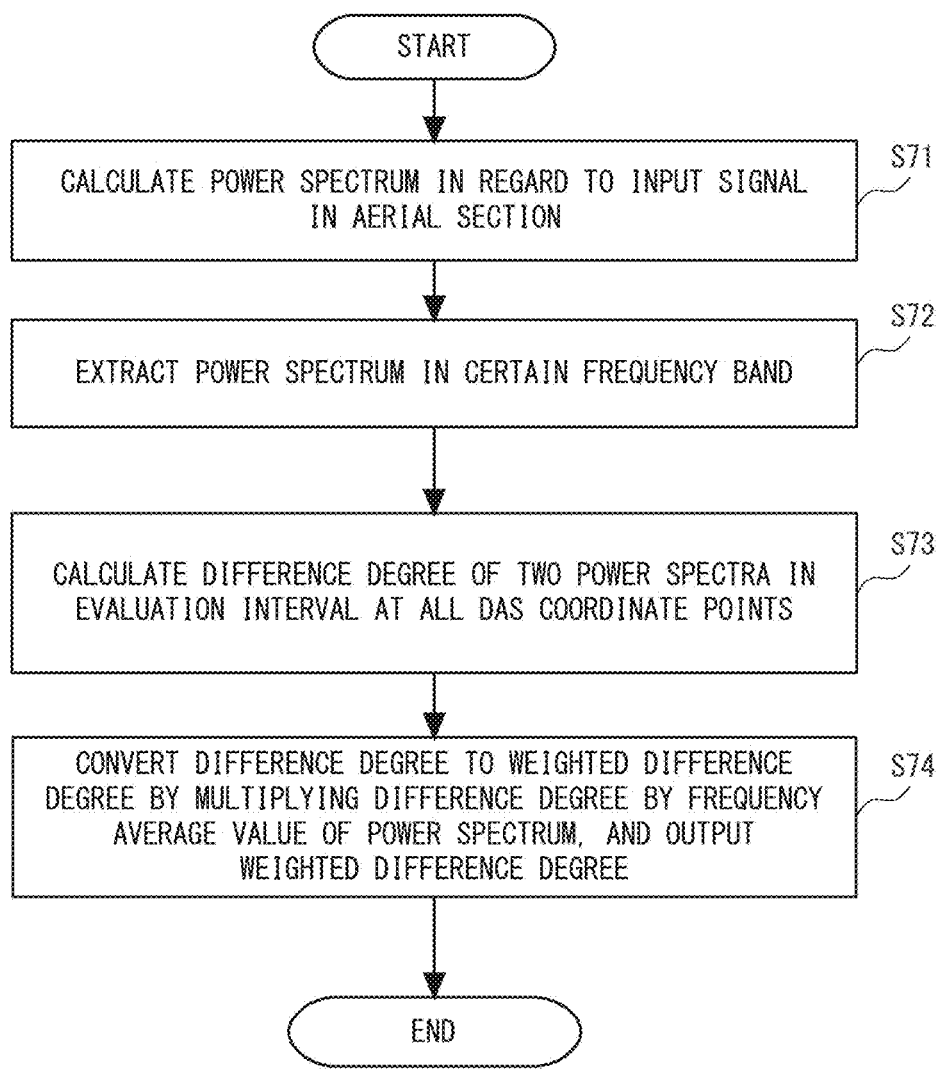
FIG. 32 is a flowchart illustrating an example of a flow of an operation of a weighted difference degree calculation unit according to the second example embodiment.

To begin with, referring to FIG. 32, an example of a flow of an operation of the weighted difference degree calculation unit 221 is described.

As illustrated in FIG. 32, to start with, the weighted difference degree calculation unit 221 extracts an input signal in a certain time slot from the input signal in the aerial section, and calculates a power spectrum in regard to the extracted input signal (step S71).

Next, the weighted difference degree calculation unit 221 extracts a power spectrum in a dominant frequency band from the power spectrum calculated in step S71 (step S72). The dominant frequency band is a frequency band including a fundamental vibration mode in the aerial section of the optical fiber.

Next, based on the power spectrum extracted in step S72, the weighted difference degree calculation unit 221 calculates the difference degree of two power spectra in the evaluation interval at all DAS coordinate points (step S73).

Thereafter, the weighted difference degree calculation unit 221 calculates a frequency average value of the power spectrum extracted in step S72 at all DAS coordinate points. Besides, the weighted difference degree calculation unit 221 calculates and outputs a weighted difference degree at all DAS coordinate points, based on the difference degree at all DAS coordinate points and the frequency average value of the power spectrum (step S74). The weighted difference degree is calculated by weighting the difference degree by the frequency average value of the power spectrum, and is obtained by a multiplication between the frequency average value of the power spectrum and the difference degree. By the weighted difference degree, the state of the point where the difference degree is high and the vibration strength is low can be characterized.

Subsequently, referring to FIG. 33, a description is given of an example of a flow of an operation of the weighted difference degree map calculation unit 222.

Figure 33:
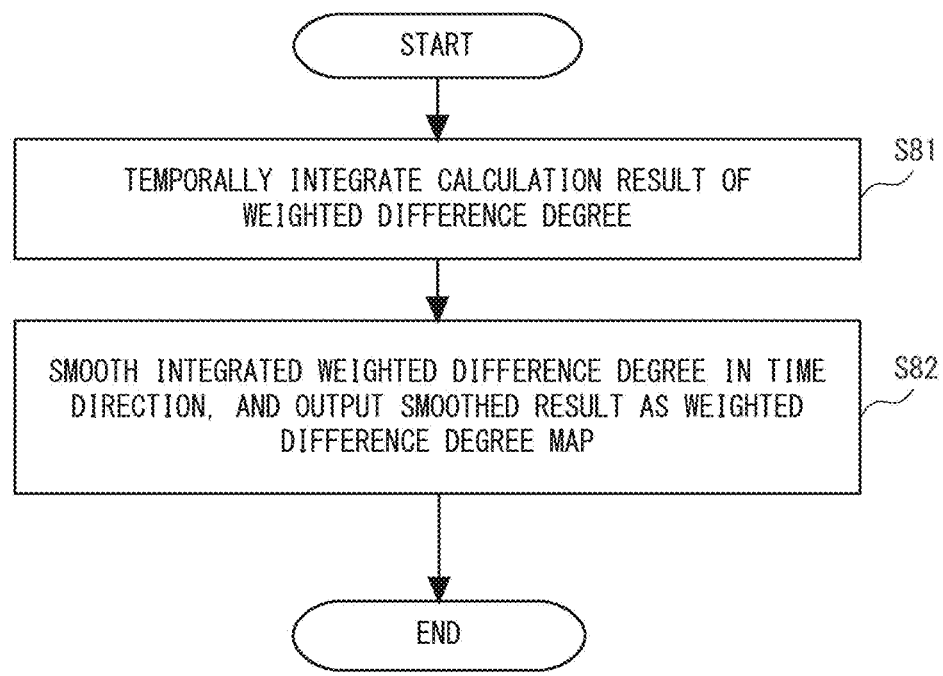
FIG. 33 is a flowchart illustrating an example of a flow of an operation of a weighted difference degree map calculation unit according to the second example embodiment.

As illustrated in FIG. 33, to start with, the weighted difference degree map calculation unit 222 temporally integrates the calculation result of the weighted difference degree calculated by the weighted difference degree calculation unit 221 (step S81).

Thereafter, the weighted difference degree map calculation unit 222 smooths the weighted difference degree, which is integrated in step S81, in a time direction, thereby calculating and outputting a weighted difference degree map (step S82). For example, the weighted difference degree map calculation unit 222 smooths the weighted difference degree by using a moving average filter or a median filter.

Figure 34:
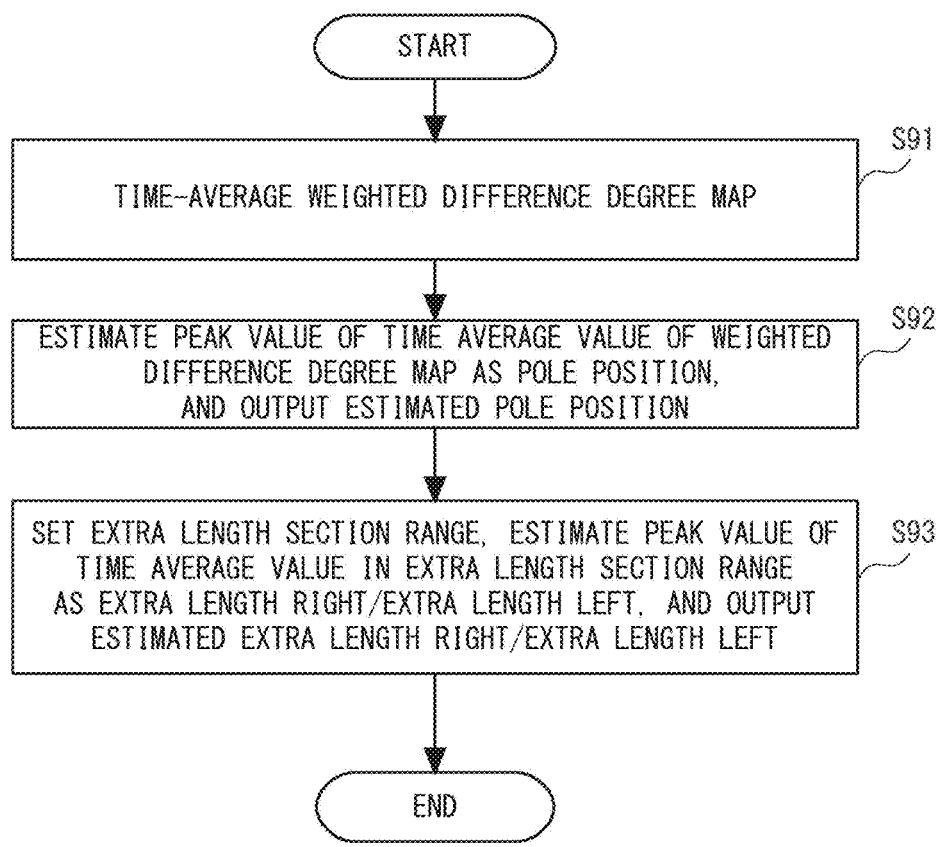
FIG. 34 is a flowchart illustrating an example of a flow of an operation of a weighted difference degree peak extraction unit according to the second example embodiment.

Next, referring to FIG. 34, a description is given of an example of a flow of an operation of the weighted difference degree peak extraction unit 223.

As illustrated in FIG. 34, to start with, the weighted difference degree peak extraction unit 223 time-averages the weighted difference degree map calculated by the weighted difference degree map calculation unit 222 (step S91).

Next, the weighted difference degree peak extraction unit 223 estimates a position, where the time average value calculated in step S91 takes a peak value, as the position of the pole, and outputs the DAS coordinate value corresponding to the estimated position as an estimation result of the position of the pole (step S92). For example, when detecting the peak value, the weighted difference degree peak extraction unit 223 uses, as an analysis window, a minimum length (for example, about 10 m or less) of one span of the optical fiber that is aerially laid over the poles. In addition, when the number of poles, whose positions are to be estimated, is known, it is preferable that the weighted difference degree peak extraction unit 223 limits the number of peaks to be detected to the number of poles.

Thereafter, the weighted difference degree peak extraction unit 223 sets an extra length section range on the DAS coordinate, based on the frequency average value of the power spectrum at all DAS coordinate points obtained by the weighted difference degree calculation unit 221. Specifically, the weighted difference degree peak extraction unit 223 sets, as an extra length section range, a range on the DAS coordinate, in which the frequency average value of the power spectrum is less than a threshold. Thereby, an approximate range, which is considered to be the extra length section of the optical fiber, is set. Note that the threshold is a percentile value in regard to the frequency average value of the power spectrum. In addition, the weighted difference degree peak extraction unit 223 estimates positions in the extra length section range, where the time average value takes peak values, as the positions of the extra length left and the extra length right, and outputs DAS coordinate values corresponding to the estimated positions as the estimation results of the positions of the extra length left and the extra length right (step S93).

Figure 35:
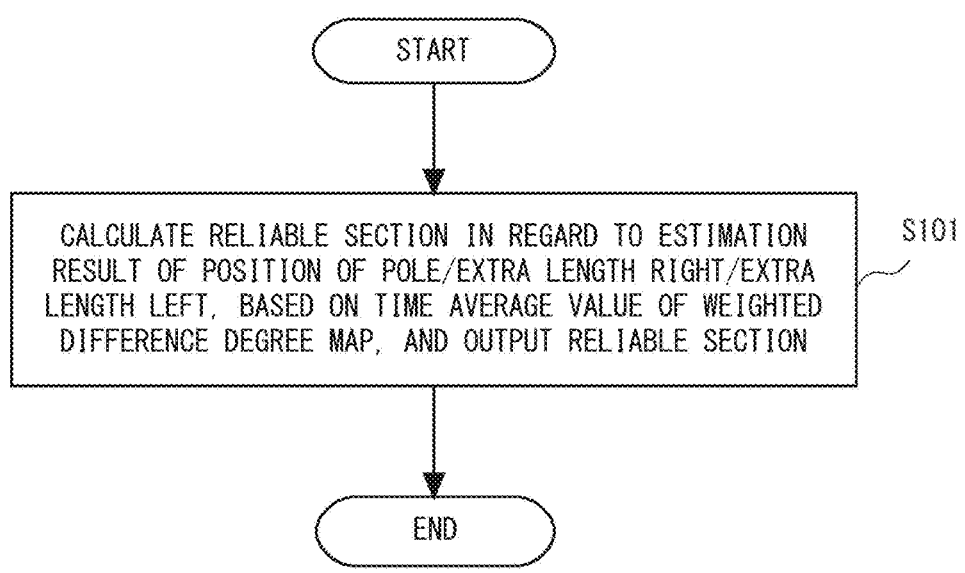
FIG. 35 is a flowchart illustrating an example of a flow of an operation of a reliable section calculation unit according to the second example embodiment.

Next, referring to FIG. 35, a description is given of an example of a flow of an operation of the reliable section calculation unit 224.

As illustrated in FIG. 35, based on the time average value of the weighted difference degree map calculated by the weighted difference degree peak extraction unit 223, the reliable section calculation unit 224 calculates and outputs a reliable section of the estimation results of the positions of the pole, extra length right and extra length left, which are estimated by the weighted difference degree peak extraction unit 223 (step S101). For example, as regards the estimation result of each pole position, the reliable section calculation unit 224 fits the time average value of the weighted difference degree map by a plurality of normal distributions, and calculates the reliable section, based on a spatial spread of the normal distributions.

Next, a description is given of a concrete example of the operation of estimating the positions of an extra length left and an extra length right, among operations of the position evaluation apparatus 20 according to the second example embodiment.

The weighted difference degree calculation unit 221 calculates the frequency average value, difference degree and weighted difference degree of the power spectrum at all DAS coordinate points. In addition, the weighted difference degree map calculation unit 222 calculates the weighted difference degree map. Furthermore, the weighted difference degree peak extraction unit 223 time-averages the weighted difference degree map.

Figure 36:
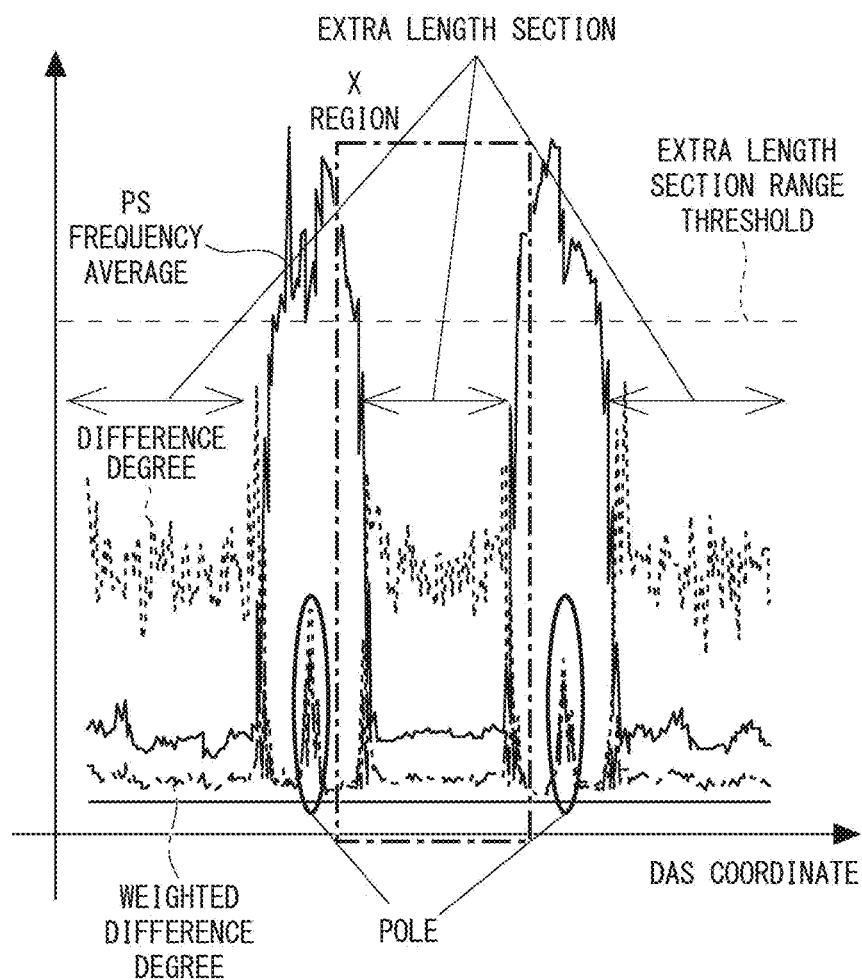
FIG. 36 is a diagram illustrating an example of a frequency average value of a power spectrum, a difference degree, and a time average value of a weighted difference degree, which are obtained in a concrete example of an operation of the position evaluation apparatus according to the second example embodiment.
Figure 37:
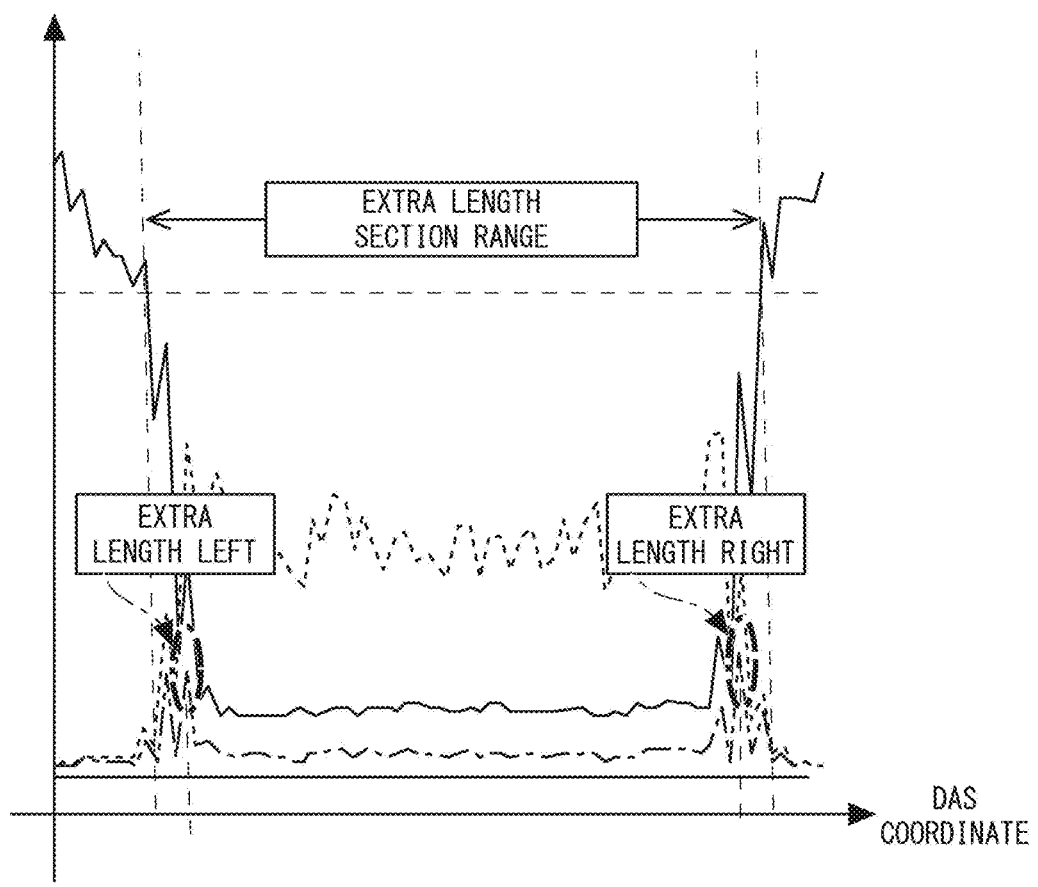
FIG. 37 is an enlarged view of an X region illustrated in FIG. 36.

As a result, it is assumed that a frequency average value of a power spectrum, a difference degree and a time average value of a weighted difference degree were obtained, as illustrated in FIG. 36 and FIG. 37. Note that FIG. 37 is an enlarged view of an X region illustrated in FIG. 36. In addition, in FIG. 36 and FIG. 37, the abscissa axis is the DAS coordinate label.

Here, in many cases, the extra length section of the optical fiber is fixed to a pole, and is hardly affected by the wind, and thus the frequency average value of the power spectrum in the extra length section becomes small.

Thus, at first, the weighted difference degree peak extraction unit 223 sets a range on the DAS coordinate, in which the frequency average value of the power spectrum is less than the threshold, to be an extra length section range that is an approximate range considered to be an extra length section of the optical fiber.

On the other hand, at a position of a change of the optical fiber from the extra length section to the aerial section, the vibration applied to the optical fiber changes, and the feature of the backscattering light changes, and thus the difference degree increases. At this time, the weighted difference degree, which is obtained by weighting the difference degree by the frequency average value of the power spectrum, exhibits peaks at the parts of the extra length left and extra length right of the optical fiber.

Thus, subsequently, the weighted difference degree peak extraction unit 223 estimates that the positions in the extra length section range, where the weighted difference degree takes peak values, are the positions of the extra length left and the extra length right of the optical fiber, and outputs the DAS coordinate values corresponding to the estimated positions.

As described above, according to the second example embodiment, the pole position evaluation unit 22 inputs, as an input signal, a phase difference signal of backscattering light in an aerial section, calculates a power spectrum in regard to the input signal, calculates a difference degree of two power spectra in an evaluation interval, and calculates a weighted difference degree that is obtained by weighting the difference degree by a frequency average value of the power spectra. In addition, the pole position evaluation unit 22 temporally integrates the calculation result of the weighted difference degree, smooths the integrated weighted difference degree in a time direction, thereby calculating a weighted difference degree map, time-averages the weighted difference degree map, estimates a position, where the time average value takes a peak value, as the position of the pole, and outputs the estimation result. Furthermore, the pole position evaluation unit 22 sets an extra length section range, estimates positions in the extra length section range, where the time average value of the weighted difference degree map takes peak values, as the positions of the extra length left and the extra length right of the optical fiber, and outputs the estimation results.

Thus, if there are points where the weighted difference degree of the power spectrum in the evaluation interval becomes maximum, even if the points are not points where a vibration of maximum strength occurs, the points can be estimated as the positions of the pole of optical fiber, extra length left and extra length right. In addition, the positions of the pole, extra length left and extra length right are estimated by limiting the analysis target section to the aerial section. Thereby, the estimation accuracy of the positions of the pole, extra length left and extra length right can be improved.

The other advantageous effects are the same as in the above-described first example embodiment.

Third Example Embodiment

A third example embodiment corresponds to an example embodiment that represents a generic concept of the above-described first and second example embodiments.

Figure 38:
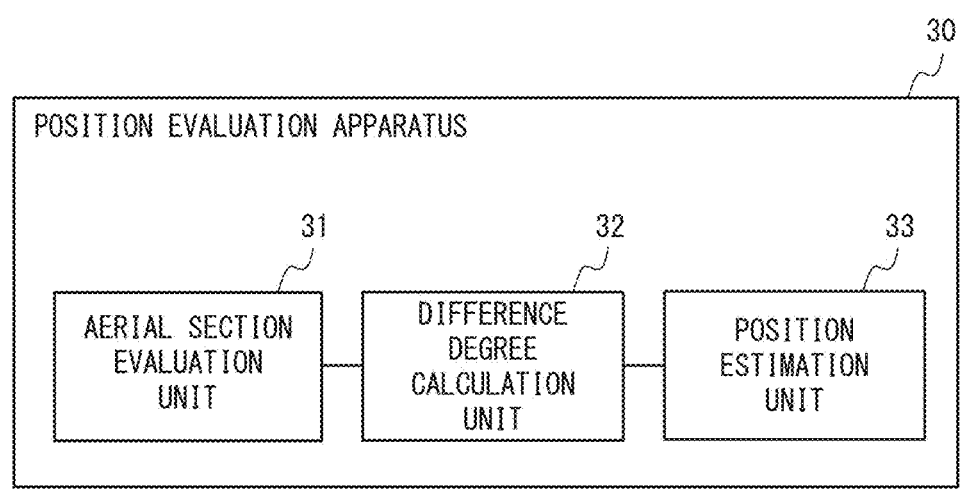
FIG. 38 is a diagram illustrating a configuration example of a position evaluation apparatus according to a third example embodiment.

Referring to FIG. 38, a description is given of a configuration example of a position evaluation apparatus 30 according to the third example embodiment.

As illustrated in FIG. 38, the position evaluation apparatus 30 according to the third example embodiment includes an aerial section evaluation unit 31, a difference degree calculation unit 32, and a position estimation unit 33.

The aerial section evaluation unit 31 inputs, from a sensor, a signal indicative of a characteristic vibration occurring at each of positions of an optical fiber, and estimates, based on the input signal, an aerial section in which the optical fiber that is aerially laid over poles is present. The aerial section evaluation unit 31 corresponds to the aerial section evaluation units 11 and 21 of the above-described first and second example embodiments. In addition, the sensor corresponds to a phase-sensitive OTDR or a DAS.

The difference degree calculation unit 32 inputs the above-described signal from the above-described sensor, calculates, based on the input signal, sensing data indicative of a vibration characteristic of each of positions of the optical fiber that is present in the aerial section, and calculates a difference degree of the sensing data between two neighboring points of the optical fiber. The difference degree calculation unit 32 corresponds to the difference degree calculation unit 121 according to the above-described first example embodiment and the weighted difference degree calculation unit 221 according to the above-described second example embodiment.

The position estimation unit 33 temporally integrates the difference degree, calculates the time average of the difference degree, estimates, based on the time average value of the difference degree, the position of the pole, on which the optical fiber is suspended, and the position of the extra length section of the optical fiber, and outputs the estimation result of the positions of the pole and the extra length section. The position estimation unit 33 corresponds to a combination of the difference degree map calculation unit 122 and difference degree peak extraction unit 123 according to the above-described first example embodiment, and a combination of the weighted difference degree map calculation unit 222 and weighted difference degree peak extraction unit 223 according to the above-described second example embodiment.

Since the third example embodiment is constituted as described above, points, which are not points where vibration of maximum strength occurs, can be estimated as positions of the pole and extra length section. In addition, the positions of the pole and extra length section are estimated by limiting the analysis target section to the aerial section. Thereby, the estimation accuracy of the positions of the pole and extra length section can be improved.

Note that the difference degree calculation unit 32 may calculate, as the sensing data, a power spectrum in a predetermined frequency band, and may calculate a difference degree of a power spectrum between two neighboring points of the optical fiber. In addition, the position estimation unit 33 may estimate a position, where the time average value of the difference degree takes a peak value, as the position of the pole.

Additionally, the position evaluation apparatus 30 according to the third example embodiment may further include a reliable section calculation unit that calculates, based on the time average value of the difference degree, a reliable section of the estimation result of the position of the pole, and outputs the calculation result of the reliable section. This reliable section calculation unit corresponds to the reliable section calculation unit 124 according to the above-described first example embodiment.

Besides, the position estimation unit 33 may generate a difference degree map that displays a temporally integrated difference degree as space-and-time data, and may output the difference degree map.

Additionally, the difference degree calculation unit 32 may calculate, as the sensing data, a power spectrum in a predetermined frequency band, may calculate a difference degree of a power spectrum between two neighboring points of the optical fiber, and may calculate a weighted difference degree that is obtained by weighting the difference degree by a frequency average value of the power spectrum. Besides, the position estimation unit 33 may temporally integrate the weighted difference degree, may calculate the time average of the weighted difference degree, may set a range, in which the frequency average value of the power spectrum is less than the threshold, to be a range of an extra length section, and may estimate that positions in the range of the extra length section, where the time average value of the weighted difference degree takes peak values, are positions of the left end and right end of the extra length section.

Additionally, the position evaluation apparatus 30 according to the third example embodiment may further include a reliable section calculation unit that calculates, based on the time average value of the weighted difference degree, a reliable section of the estimation result of the positions of the left end and right end of the extra length section, and outputs the calculation result of the reliable section. This reliable section calculation unit corresponds to the reliable section calculation unit 224 according to the above-described second example embodiment.

Besides, the position estimation unit 33 may generate a weighted difference degree map that displays a temporally integrated weighted difference degree as space-and-time data, and may output the weighted difference degree map.

<Hardware Configuration of Position Evaluation Apparatus According to Example Embodiments>

Figure 39:
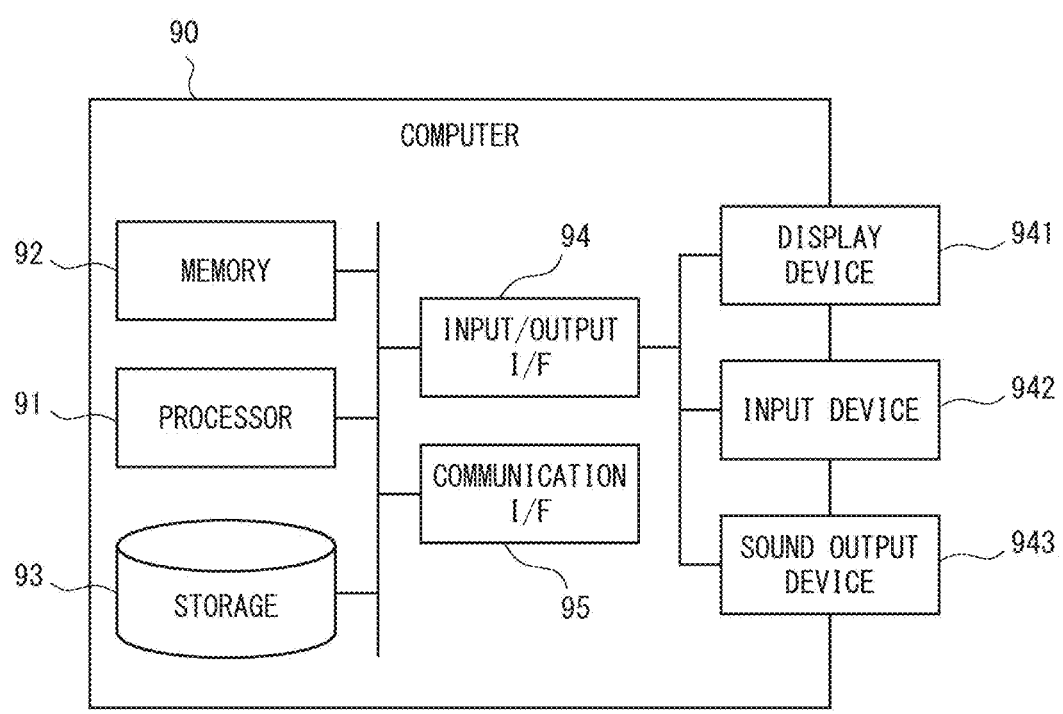
FIG. 39 is a block diagram illustrating a hardware configuration example of a computer that implements the position evaluation apparatus of each example embodiment.

Referring to FIG. 39, a description is given of a hardware configuration example of a computer 90 that implements the position evaluation apparatuses 10, and 30 according to the above-described first, second and third example embodiments.

As illustrated in FIG. 39, the computer 90 includes a processor 91, a memory 92, a storage 93, an input/output interface (input/output I/F) 94, and a communication interface (communication I/F) 95. The processor 91, memory 92, storage 93, input/output interface 94, and communication interface 95 are connected by a data transmission path for mutually transmitting and receiving data.

The processor 91 is an arithmetic processing device such as a CPU (Central Processing Unit) or a GPU (Graphics Processing Unit). The memory 92 is a memory such as a RAM (Random Access Memory) or a ROM (Read Only Memory). The storage 93 is a storage device such as an HDD (Hard Disk Drive), an SSD (Solid State Drive) or a memory card. Besides, the storage 93 may be a memory such as a RAM or a ROM.

The storage 93 stores a program. The program includes an instruction group (or software code) for causing the computer 90 to execute one or more functions in the above-described position evaluation apparatus 10, 20, 30, when the program is read in the computer. The structural components in the above-described position evaluation apparatus 10, 20, 30 may be implemented by the processor 91 reading and executing the program stored in the storage 93. Besides, the storage functions in the above-described position evaluation apparatus 10, 20, 30 may be implemented by the memory 92 or storage 93.

Additionally, the above-described program may be stored in a non-transitory computer readable medium or a tangible storage medium. Examples of the computer readable medium or tangible storage medium include, though not limited to, a RAM, a ROM, a flash memory, an SSD, or other memory technologies, a CD (Compact Disc)-ROM, a DVD (Digital Versatile Disc), a Blu-ray (trademark) disc, or other optical disc storages, and a magnetic cassette, a magnetic tape, a magnetic disc storage or other magnetic storage devices. The program may be transmitted on a transitory computer readable medium or a communication medium. Examples of the transitory computer readable medium or communication medium include, though not limited to, a propagation signal of an electric, optical, acoustic or other format.

The input/output interface 94 is connected to a display device 941, an input device 942 and a sound output device 943. The display device 941 is a device that displays a screen corresponding to rendering data processed by the processor 91, such as an LCD (Liquid Crystal Display), a CRT (Cathode Ray Tube) display, or a monitor. The input device 942 is a device that accepts an operation input of an operator, and is, for example, a keyboard, a mouse, a touch sensor, or the like. The display device 941 and the input device 942 may be integrated and implemented as a touch panel. The sound output device 943 is, like a speaker, a device that acoustically outputs sound corresponding to acoustic data processed by the processor 91.

The communication interface 95 transmits and receives data to and from an external device. For example, the communication interface 95 communicates with an external device via a wired communication path or a wireless communication path.

The present disclosure has been described above with reference to the example embodiments, but the present disclosure is not limited to the above-described example embodiments. Various changes, which are understandable by a skilled person, can be made to the structure and details of the present disclosure within the scope of the present disclosure. For example, the above-described example embodiments may be partly or entirely combined and used.

The whole or part of the example embodiments disclosed above can be described as, but not limited to, the following supplementary notes.

(Supplementary Note 1)

A position evaluation apparatus including:

an aerial section evaluation unit configured to input, from a sensor, a signal indicating a characteristic vibration occurring at each position of an optical fiber, and estimate, based on the input signal, an aerial section in which the optical fiber being aerially laid over a pole is present;

a difference degree calculation unit configured to input the signal from the sensor, calculate, based on the input signal, sensing data indicating a vibration characteristic of each position of the optical fiber that is present in the aerial section, and calculate a difference degree of the sensing data between two neighboring points of the optical fiber; and a position estimation unit configured to temporally integrate the difference degree, calculate a time average of the difference degree, estimate, based on a time average value of the difference degree, a position of the pole and a position of an extra length section of the optical fiber, and output an estimation result of positions of the pole and the extra length section.

(Supplementary Note 2)

The position evaluation apparatus according to Supplementary note 1, wherein the difference degree calculation unit is configured to:

calculate a power spectrum in a predetermined frequency band as the sensing data; and calculate a difference degree of the power spectrum between two neighboring points of the optical fiber, and the position estimation unit is configured to estimate a position where a time average value of the difference degree takes a peak value, as the position of the pole.

(Supplementary Note 3)

The position evaluation apparatus according to Supplementary note 2, further including a reliable section calculation unit configured to calculate, based on a time average value of the difference degree, a reliable section of an estimation result of the position of the pole, and output a calculation result of the reliable section.

(Supplementary Note 4)

The position evaluation apparatus according to Supplementary note 2, wherein the position estimation unit is configured to:

generate a difference degree map that displays the difference degree being temporally integrated, as space-and-time data; and output the difference degree map.

(Supplementary Note 5)

The position evaluation apparatus according to Supplementary note 1, wherein the difference degree calculation unit is configured to:

calculate a power spectrum in a predetermined frequency band as the sensing data;

calculate a difference degree of the power spectrum between two neighboring points of the optical fiber; and calculate a weighted difference degree acquired by weighting the difference degree by a frequency average value of the power spectrum, and the position estimation unit is configured to:

temporally integrate the weighted difference degree;

calculate a time average of the weighted difference degree;

set a range in which a frequency average value of the power spectrum is less than a threshold, as a range of the extra length section; and estimate positions in the range of the extra length section, where a time average value of the weighted difference degree takes peak values, as positions of a left end and a right end of the extra length section.

(Supplementary Note 6)

The position evaluation apparatus according to Supplementary note 5, further including a reliable section calculation unit configured to calculate, based on a time average value of the weighted difference degree, a reliable section of an estimation result of positions of the left end and the right end of the extra length section, and output a calculation result of the reliable section.

(Supplementary Note 7)

The position evaluation apparatus according to Supplementary note 5, wherein the position estimation unit is configured to:

generate a weighted difference degree map that displays the weighted difference degree being temporally integrated, as space-and-time data; and output the weighted difference degree map.

(Supplementary Note 8)

A position evaluation method being executed by a position evaluation apparatus, the method including:

an aerial section evaluation step of inputting, from a sensor, a signal indicating a characteristic vibration occurring at each position of an optical fiber, and estimating, based on the input signal, an aerial section in which the optical fiber being aerially laid over a pole is present;

a difference degree calculation step of calculating, based on the input signal, sensing data indicating a vibration characteristic of each position of the optical fiber being present in the aerial section, and calculating a difference degree of the sensing data between two neighboring points of the optical fiber; and a position estimation step of temporally integrating the difference degree, calculating a time average of the difference degree, estimating, based on a time average value of the difference degree, a position of the pole and a position of an extra length section of the optical fiber, and outputting an estimation result of positions of the pole and the extra length section.

(Supplementary Note 9)

The position evaluation method according to Supplementary note 8, wherein the difference degree calculation step includes:

calculating a power spectrum in a predetermined frequency band as the sensing data; and calculating a difference degree of the power spectrum between two neighboring points of the optical fiber, and the position estimation step includes estimating a position, where a time average value of the difference degree takes a peak value, as the position of the pole.

(Supplementary Note 10)

The position evaluation method according to Supplementary note 9, further including a reliable section calculation step of calculating, based on a time average value of the difference degree, a reliable section of an estimation result of the position of the pole, and outputting a calculation result of the reliable section.

(Supplementary Note 11)

The position evaluation method according to Supplementary note 9, wherein the position estimation step includes:

generating a difference degree map that displays the difference degree being temporally integrated, as space-and-time data; and outputting the difference degree map.

(Supplementary Note 12)

The position evaluation method according to Supplementary note 8, wherein the difference degree calculation step includes:

calculating a power spectrum in a predetermined frequency band as the sensing data;

calculating a difference degree of the power spectrum between two neighboring points of the optical fiber; and calculating a weighted difference degree acquired by weighting the difference degree by a frequency average value of the power spectrum, and the position estimation step includes:

temporally integrating the weighted difference degree;

calculating a time average of the weighted difference degree;

setting a range in which a frequency average value of the power spectrum is less than a threshold, as a range of the extra length section; and estimating positions in the range of the extra length section, where a time average value of the weighted difference degree takes peak values, as positions of a left end and a right end of the extra length section.

(Supplementary Note 13)

The position evaluation method according to Supplementary note 12, further including a reliable section calculation step of calculating, based on a time average value of the weighted difference degree, a reliable section of an estimation result of positions of the left end and the right end of the extra length section, and outputting a calculation result of the reliable section.

(Supplementary Note 14)

The position evaluation method according to Supplementary note 12, wherein the position estimation step includes:

generating a weighted difference degree map that displays the weighted difference degree being temporally integrated, as space-and-time data; and outputting the weighted difference degree map.

(Supplementary Note 15)

A program for causing a computer to execute:

an aerial section evaluation procedure of inputting, from a sensor, a signal indicating a characteristic vibration occurring at each position of an optical fiber, and estimating, based on the input signal, an aerial section in which the optical fiber being aerially laid over a pole is present;

a difference degree calculation procedure of calculating, based on the input signal, sensing data indicating a vibration characteristic of each position of the optical fiber being present in the aerial section, and calculating a difference degree of the sensing data between two neighboring points of the optical fiber; and a position estimation procedure of temporally integrating the difference degree, calculating a time average of the difference degree, estimating, based on a time average value of the difference degree, a position of the pole and a position of an extra length section of the optical fiber, and outputting an estimation result of positions of the pole and the extra length section.

(Supplementary Note 16)

The program according to Supplementary note 15, wherein the difference degree calculation procedure includes:

calculating a power spectrum in a predetermined frequency band as the sensing data; and calculating a difference degree of the power spectrum between two neighboring points of the optical fiber, and the position estimation procedure includes estimating a position where a time average value of the difference degree takes a peak value, as the position of the pole.

(Supplementary Note 17)

The program according to Supplementary note 16, wherein the program causes the computer to further execute a reliable section calculation procedure of calculating, based on a time average value of the difference degree, a reliable section of an estimation result of the position of the pole, and outputting a calculation result of the reliable section.

(Supplementary Note 18)

The program according to Supplementary note 16, wherein the position estimation procedure includes:

generating a difference degree map that displays the difference degree being temporally integrated, as space-and-time data; and outputting the difference degree map.

(Supplementary Note 19)

The program according to Supplementary note 15, wherein the difference degree calculation procedure includes:

calculating a power spectrum in a predetermined frequency band as the sensing data;

calculating a difference degree of the power spectrum between two neighboring points of the optical fiber; and calculating a weighted difference degree acquired by weighting the difference degree by a frequency average value of the power spectrum, and the position estimation procedure includes:

temporally integrating the weighted difference degree;

calculating a time average of the weighted difference degree;

setting a range in which a frequency average value of the power spectrum is less than a threshold, as a range of the extra length section; and estimating positions in the range of the extra length section, where a time average value of the weighted difference degree takes peak values, as positions of a left end and a right end of the extra length section.

(Supplementary Note 20)

The program according to Supplementary note 19, wherein the program causes the computer to further execute a reliable section calculation procedure of calculating, based on a time average value of the weighted difference degree, a reliable section of an estimation result of positions of the left end and the right end of the extra length section, and outputting a calculation result of the reliable section.

(Supplementary Note 21)

The program according to Supplementary note 19, wherein the position estimation procedure includes:

generating a weighted difference degree map that displays the weighted difference degree being temporally integrated, as space-and-time data; and outputting the weighted difference degree map.

What is claimed is:

1. A position evaluation apparatus comprising:

at least one memory configured to store an instruction group; and at least one processor configured to, by executing the instruction group:

input, from a sensor, a signal indicating a characteristic vibration occurring at each position of an optical fiber, and estimate, based on the input signal, an aerial section in which the optical fiber being aerially laid over a pole is present;

calculate, based on the input signal, sensing data indicating a vibration characteristic of each position of the optical fiber that is present in the aerial section, and calculate a difference degree of the sensing data between two neighboring points of the optical fiber; and temporally integrate the difference degree, calculate a time average of the difference degree, estimate, based on a time average value of the difference degree, a position of the pole and a position of an extra length section of the optical fiber, and output an estimation result of positions of the pole and the extra length section.

2. The position evaluation apparatus according to claim 1, wherein the at least one processor is configured to, by further executing the instruction group:

calculate a power spectrum in a predetermined frequency band as the sensing data;

calculate a difference degree of the power spectrum between two neighboring points of the optical fiber; and estimate a position where a time average value of the difference degree takes a peak value, as the position of the pole.

3. The position evaluation apparatus according to claim 2, wherein the at least one processor is configured to, by further executing the instruction group, calculate, based on a time average value of the difference degree, a reliable section of an estimation result of the position of the pole, and output a calculation result of the reliable section.

4. The position evaluation apparatus according to claim 2, wherein the at least one processor is configured to, by further executing the instruction group:

generate a difference degree map that displays the difference degree being temporally integrated, as space-and-time data; and output the difference degree map.

5. The position evaluation apparatus according to claim 1, wherein the at least one processor is configured to, by further executing the instruction group:

calculate a power spectrum in a predetermined frequency band as the sensing data;

calculate a difference degree of the power spectrum between two neighboring points of the optical fiber;

calculate a weighted difference degree acquired by weighting the difference degree by a frequency average value of the power spectrum;

temporally integrate the weighted difference degree;

calculate a time average of the weighted difference degree;

set a range in which a frequency average value of the power spectrum is less than a threshold, as a range of the extra length section; and estimate positions in the range of the extra length section, where a time average value of the weighted difference degree takes peak values, as positions of a left end and a right end of the extra length section.

6. The position evaluation apparatus according to claim 5, wherein the at least one processor is configured to, by further executing the instruction group calculate, based on a time average value of the weighted difference degree, a reliable section of an estimation result of positions of the left end and the right end of the extra length section, and output a calculation result of the reliable section.

7. The position evaluation apparatus according to claim 5 wherein the at least one processor is configured to, by further executing the instruction group:

generate a weighted difference degree map that displays the weighted difference degree being temporally integrated, as space-and-time data; and output the weighted difference degree map.

8. A position evaluation method being executed by a position evaluation apparatus, the method comprising:

an aerial section evaluation step of inputting, from a sensor, a signal indicating a characteristic vibration occurring at each position of an optical fiber, and estimating, based on the input signal, an aerial section in which the optical fiber being aerially laid over a pole is present;

a difference degree calculation step of calculating, based on the input signal, sensing data indicating a vibration characteristic of each position of the optical fiber being present in the aerial section, and calculating a difference degree of the sensing data between two neighboring points of the optical fiber; and a position estimation step of temporally integrating the difference degree, calculating a time average of the difference degree, estimating, based on a time average value of the difference degree, a position of the pole and a position of an extra length section of the optical fiber, and outputting an estimation result of positions of the pole and the extra length section.

9. The position evaluation method according to claim 8, wherein the difference degree calculation step includes:

calculating a power spectrum in a predetermined frequency band as the sensing data; and calculating a difference degree of the power spectrum between two neighboring points of the optical fiber, and the position estimation step includes estimating a position where a time average value of the difference degree takes a peak value, as the position of the pole.

10. The position evaluation method according to claim 9, further comprising a reliable section calculation step of calculating, based on a time average value of the difference degree, a reliable section of an estimation result of the position of the pole, and outputting a calculation result of the reliable section.

11. The position evaluation method according to claim 9, wherein the position estimation step includes:

generating a difference degree map that displays the difference degree being temporally integrated, as space-and-time data; and outputting the difference degree map.

12. The position evaluation method according to claim 8, wherein the difference degree calculation step includes:

calculating a power spectrum in a predetermined frequency band as the sensing data;

calculating a difference degree of the power spectrum between two neighboring points of the optical fiber; and calculating a weighted difference degree acquired by weighting the difference degree by a frequency average value of the power spectrum, and the position estimation step includes:

temporally integrating the weighted difference degree;

calculating a time average of the weighted difference degree;

setting a range in which a frequency average value of the power spectrum is less than a threshold, as a range of the extra length section; and estimating positions in the range of the extra length section, where a time average value of the weighted difference degree takes peak values, as positions of a left end and a right end of the extra length section.

13. The position evaluation method according to claim 12, further comprising a reliable section calculation step of calculating, based on a time average value of the weighted difference degree, a reliable section of an estimation result of positions of the left end and the right end of the extra length section, and outputting a calculation result of the reliable section.

14. The position evaluation method according to claim 12, wherein the position estimation step includes:
generating a weighted difference degree map that displays the weighted difference degree being temporally integrated, as space-and-time data; and
outputting the weighted difference degree map.

15. A non-transitory computer readable medium storing a program that causes a computer to execute:
an aerial section evaluation procedure of inputting, from a sensor, a signal indicating a characteristic vibration occurring at each position of an optical fiber, and estimating, based on the input signal, an aerial section in which the optical fiber being aerially laid over a pole is present;
a difference degree calculation procedure of calculating, based on the input signal, sensing data indicating a vibration characteristic of each position of the optical fiber being present in the aerial section, and calculating a difference degree of the sensing data between two neighboring points of the optical fiber;
and a position estimation procedure of temporally integrating the difference degree, calculating a time average of the difference degree, estimating, based on a time average value of the difference degree, a position of the pole and a position of an extra length section of the optical fiber, and outputting an estimation result of positions of the pole and the extra length section.

16. The non-transitory computer readable medium according to claim 15, wherein
the difference degree calculation procedure includes:
calculating a power spectrum in a predetermined frequency band as the sensing data; and
calculating a difference degree of the power spectrum between two neighboring points of the optical fiber, and
the position estimation procedure includes estimating a position where a time average value of the difference degree takes a peak value, as the position of the pole.

17. The non-transitory computer readable medium according to claim 16, wherein the program causes the computer to further execute a reliable section calculation procedure of calculating, based on a time average value of the difference degree, a reliable section of an estimation result of the position of the pole, and outputting a calculation result of the reliable section.

18. The non-transitory computer readable medium according to claim 16, wherein the position estimation procedure includes:
generating a difference degree map that displays the difference degree being temporally integrated, as space-and-time data; and
outputting the difference degree map.

19. The non-transitory computer readable medium according to claim 15, wherein
the difference degree calculation procedure includes:
calculating a power spectrum in a predetermined frequency band as the sensing data;
calculating a difference degree of the power spectrum between two neighboring points of the optical fiber; and
calculating a weighted difference degree acquired by weighting the difference degree by a frequency average value of the power spectrum, and
the position estimation procedure includes:
temporally integrating the weighted difference degree;
calculating a time average of the weighted difference degree;
setting a range in which a frequency average value of the power spectrum is less than a threshold, as a range of the extra length section; and
estimating positions in the range of the extra length section, where a time average value of the weighted difference degree takes peak values, as positions of a left end and a right end of the extra length section.

20. The non-transitory computer readable medium according to claim 19, wherein the program causes the computer to further execute a reliable section calculation procedure of calculating, based on a time average value of the weighted difference degree, a reliable section of an estimation result of positions of the left end and the right end of the extra length section, and outputting a calculation result of the reliable section.

21. The non-transitory computer readable medium according to claim 19, wherein the position estimation procedure includes:
generating a weighted difference degree map that displays the weighted difference degree being temporally integrated, as space-and-time data; and
outputting the weighted difference degree map.

* * * * *